United States Patent [19]

Sopko

[11] Patent Number: 5,244,321
[45] Date of Patent: Sep. 14, 1993

[54] KEY CUTTING APPARATUS

[75] Inventor: Riley M. Sopko, Palos Verdes Estates, Calif.

[73] Assignee: Keymak Company, Anaheim, Calif.

[21] Appl. No.: 823,152

[22] Filed: Jan. 21, 1992

[51] Int. Cl.$^5$ ............................................. B23C 3/00
[52] U.S. Cl. ...................................... 409/82; 76/110
[58] Field of Search .................... 409/81, 82, 83, 84; 76/110

[56] References Cited

U.S. PATENT DOCUMENTS

| 1,750,218 | 3/1930 | Falk | 409/82 |
| 1,811,922 | 6/1931 | Falk | 409/81 |
| 1,886,641 | 11/1932 | Caron | 409/82 |
| 2,098,728 | 11/1937 | McPhee | 409/82 |
| 4,090,303 | 5/1978 | Uyeda . | |
| 4,117,763 | 10/1978 | Uyeda | 409/82 |

Primary Examiner—Daniel W. Howell
Attorney, Agent, or Firm—Knobbe, Martens, Olson & Bear

[57] ABSTRACT

A code key cutting apparatus for cutting keys according to the majority of key-lock manufacturers codes as to the location, depth and shape of notches cut into a key blank. The apparatus includes a notch location mechanism and a depth location mechanism, each having a carriage coupled to an indexing dial to indicate the extent of travel of the carriage. The indexing dial is positionable without moving the carriage thus enabling the indexing mechanism to be initialized according to any lock manufacture specifications. In addition, the apparatus includes a notch tracing mechanism to cut a variety of notch shapes into a key blank without changing the cutting blade.

27 Claims, 14 Drawing Sheets

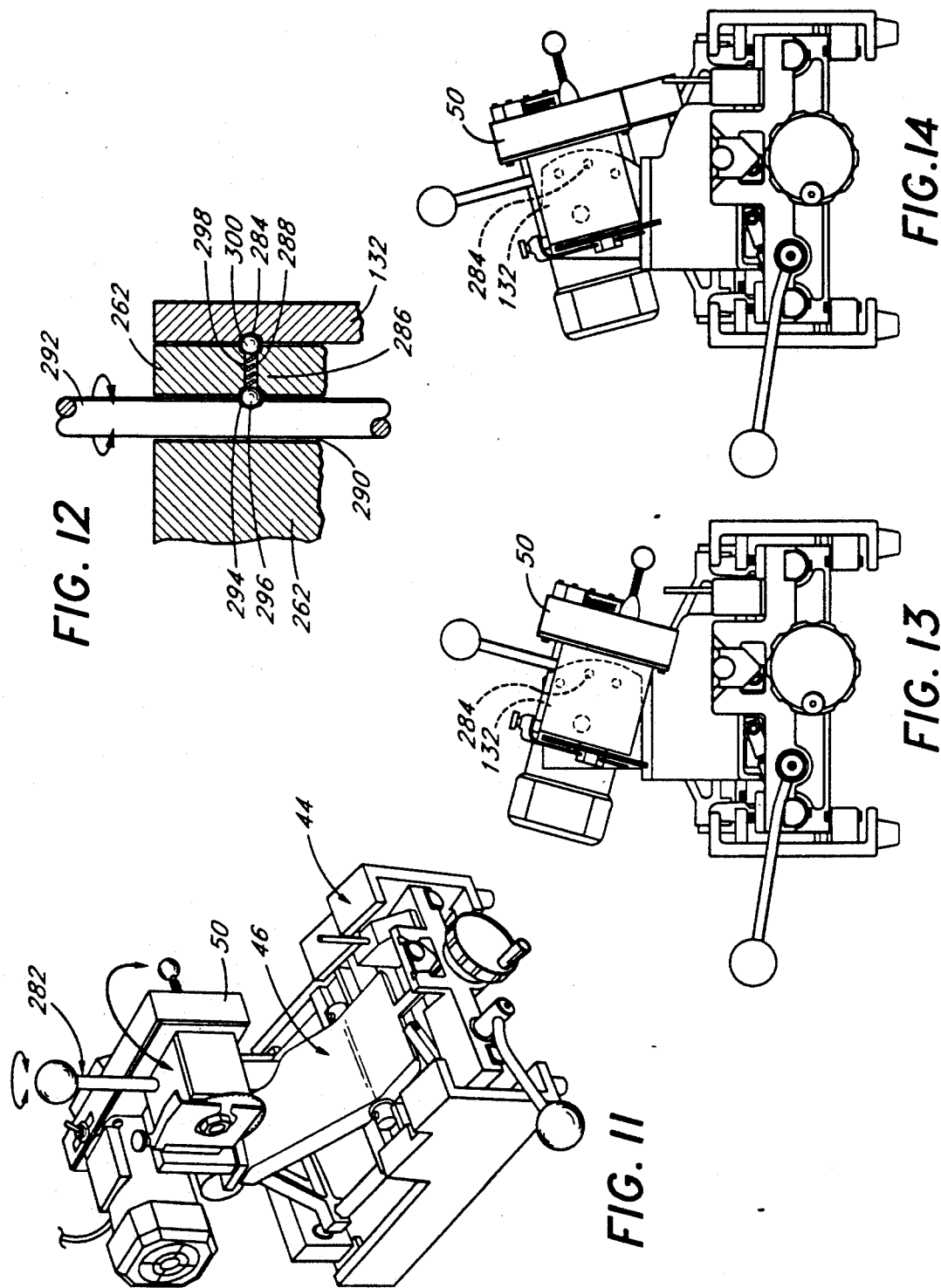

KEY CUTTING APPARATUS

BACKGROUND OF THE INVENTION

1. Field of the Invention

The present invention generally relates to a key cutting apparatus and, more particularly, relates to an apparatus for cutting keys according to key-lock manufacturers' codes.

2. Description of Related Art

Key-lock manufacturers conventionally space a series of notches along a key edge at incremental intervals and vary the depth of each notch by increments. For example, one manufacturer may use 0.156 inch intervals between each notch and vary the depth of each notch by increments of 0.015 inch. Another manufacturer may use 0.170 inch intervals between each notch and vary the depth of each notch by increments of 0.0125 inch. Consequently, a key produced by the first manufacturer will not open a lock produced by the second manufacturer. On the other hand, a significant number of key-lock manufacturers use the identical incrementation for spacing and/or depth.

Despite the use of identical spacing and depth incrementation, keys produced by different manufacturers are still distinct from one another. The reason for this is that key-lock manufacturers have adopted different first notch locations, measured from a shoulder or stop on the key, to commence their series of incrementally spaced notches. Likewise, key-lock manufacturers have selected distinct depth positions, measured from a rear or non-working edge of the key, as a datum or zero-position from which the depth of their notches are measured. As a result, although two key-lock manufacturers may use the identical incrementation for both spacing and depth, the selection of different initialization points will produce different keys.

In addition, not only do the spacing and depth of the notches cut into keys vary among manufacturers, the shape of the notches varies as well. Keys commonly have v-shaped notches. The width of the v-shape, and thus the incline angle (i.e., the angle formed between a line parallel to the key edge and the side of the notch) of its sides, however, vary from manufacture to manufacture.

Prior code key cutting machines have difficulty adjusting for the variations in the aforementioned parameters between key-lock manufacturers. Most code key cutting machines utilize a combined depth and spacing index system for each manufacturer. As over one hundred and fifty key-lock manufacturers exist in the United States alone, the difficulty of maintaining and organizing the necessary keys every manufacturer, will be appreciated.

U.S. Pat. No. 4,090,303 issued to Uyeda, however, discloses a code key cutting machine having an indexing drum with a plurality of rows of notches. Each row of notches corresponds to a spacing code of one manufacturer. The code key cutting machine additionally includes a separate depth measurement gauge for use with a graph card having a series of rows, each row having a series of incremental markings corresponding to a depth code of one manufacturer. Uyeda discloses using a single drum and card for several manufacturers. Nonetheless, a locksmith using the Uyeda machine must constantly change indexing drums and cutting blades when cutting keys for locks produced by different manufacturers. This procedure is cumbersome and time-consuming and increases the possibility of dropping and breaking the cutting blades and indexing drums due to the frequency of handling these components. In addition, the initial notch cut cannot be independently set from the spacing drum, and thus all key types which share the same spacing increments cannot be accommodated with a single drum.

Thus, these is a need for a code cutting machine readily adaptable to cut key according to the gamut of key-lock manufacturers' codes.

SUMMARY OF THE INVENTION

The present invention overcomes the drawbacks of the prior art devices by providing an improved apparatus for cutting notches along and into key blank working edges in accordance with predetermined specifications. The apparatus includes a cutting blade having a sharp leading edge for cutting a key blank, a clamp for selectively securing the key blank in a position with its working edge facing the cutting edge of the cutting blade and a key carriage for moving the clamp transverse (desirably perpendicular) to the plane of the cutting blade. The apparatus further includes a first gauge for monitoring movement of the clamp and a first linkage coupling the key carriage to the first monitoring gauge such that the first gauge is freely movable relative the key carriage, thereby permitting the selective initialization of the first gauge, yet converting movement of said key carriage into movement of the first gauge. Desirably, the linkage includes a first frictional connection which is able to communicate a maximum amount of force. Movement of the portion of the linkage to the key carriage side of the frictional connection being resisted by frictional forces greater than the maximum amount of force able to be communicated by the frictional connection, so that movement of the first gauge for initialization purposes does not result in movement of the key carriage. On the other hand, movement of the portion of the first linkage to the first gauge side of the linkage is resisted by frictional forces less than the maximum amount of force which can be communicated by the first frictional connection, so that movement of the key carriage results in movement of the first gauge. Preferably, the first gauge is a rotatable dial and incorporates a removable template including a plurality of indexing marks spaced apart by dimensional increment proportionally corresponding to a dimensional increment between notch positions on the key blank.

The apparatus further desirably incorporates a motor carriage for moving the cutting blade transverse to the longitudinal axis of the key blank and parallel to the plane defined by the cutting blade a key blank secured within said clamp, a second gauge for monitoring movement of the motor carriage in a direction transverse to the longitudinal axis of a key blank secured within the clamp and a second linkage coupling the motor carriage to the second monitoring gauge so that the second gauge is freely movable relative the motor carriage thereby permitting the selective initialization of the second gauge, yet converting movement of said motor carriage into movement of the second gauge. Desirably, this linkage includes a second frictional connection with movement of the portion of the second linkage to the motor carriage side of the second frictional connection being resisted by frictional forces greater than the maximum level of force which can be communicated by the second frictional connection. Thus, the motor carriage is not moved as a result of movement of the second gauge for initialization purposes. The movement of the portion of the second linkage to the second gauge side of the second frictional connection is resisted by frictional forces less than the maximum level of force which can be communicated by the second frictional connection. Accordingly, movement of the motor carriage results in movement of the second gauge. Preferably, the second gauge is a rotatable dial and incorporates a second removable template including a plurality of indexing marks spaced apart by dimensional increment proportionally corresponding to a predetermined desired dimensional increment between notch depths.

Another aspect of the invention is an apparatus for cutting notches along and into a key blank including a cutting blade, a clamp to secure the key blank in a position exposing the working edge of the key blank to the cutting blade, a notch template having a profile defined by a profile surface, wherein the profile proportionally corresponds to a desired notch profile to be cut into the key blank working edge. A rocker carriage is adapted to move generally parallel to the profile of the notch template and is coupled with the cutting blade to move the cutting blade both parallel and transverse to the key blank working edge secured in the clamp. A stylus shaft is coupled to the rocker carriage and is positioned to contact the notch template profile and trace the shape of the notch template profile as the rocker carriage moves parallel to the notch template. The rocker carriage is adapted to rock the cutting blade into contact with the key blank to cut the desired notch profile into the key blank as the stylus shaft traces the desired notch profile from the template.

Another aspect of the invention is a method of cutting notches along and into a key blank working edge in accordance with predetermined specifications regarding the location of each notch along the working edge relative to the shoulder of the key blank and the depth of each notch into the key blank relative to a non-working edge of a key blank. The method includes the steps of positioning a carriage in an initial position relative to a cutting blade, setting an index dial in an initial position by aligning an initial index mark on the dial with a datum mark without moving the carriage from the initial position, moving the first carriage from the initial position to a first position while moving the dial an amount proportional to the movement of the carriage and determining said first position by stopping movement of the carriage when the first index mark on the dial is aligned with the datum and moving the cutting blade into contact with the key blank to cut a notch at the first position.

BRIEF DESCRIPTION OF THE DRAWINGS

These and other features of the invention will now be described with reference to drawings of a preferred embodiment which is intended to illustrate, and not to limit, the invention, and in which:

FIG. 8a is a cross-sectional view of the index dial of FIG. 8 taken along line 8a—8a;

FIG. 11 is a partial perspective view of the code key cutting machine of FIG. 1 with a indexing assembly and a key carriage assembly having been removed;

FIG. 12 is a partial cross-sectional view of the code key cutting machine of FIG. 11, schematically illustrating a tilt mechanism contained within a cutting blade shaft support block;

FIG. 13 is a front elevational view of the code key cutting machine of FIG. 11 schematically illustrating a motor assembly in a tilted position;

FIG. 14 is another front elevational view of the code key cutting machine of FIG. 11 schematically illustrating the motor assembly tilted in an opposite direction from the position illustrated in FIG. 13;

DETAILED DESCRIPTION OF THE PREFERRED EMBODIMENT

Figure 1:
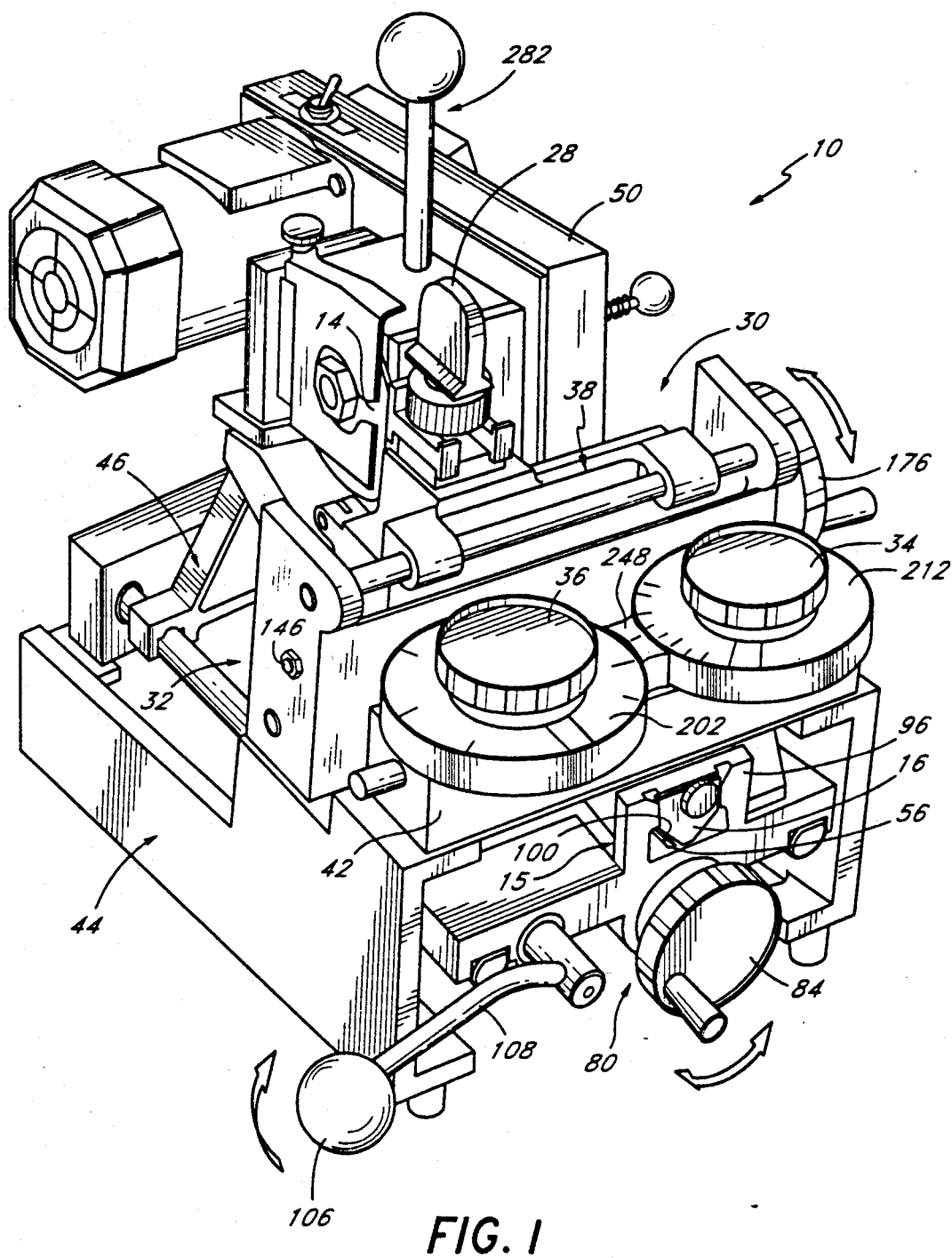
FIG. 1 is a perspective view of a code key cutting machine in accordance with a preferred embodiment of the present invention.

FIG. 1 illustrates a preferred embodiment of a code key cutting machine 10. The cutting machine 10 cuts keys according to the majority of key-lock manufacturers' codes as to the location, depth and shape of notches cut into a key blank 12. The versatility of the cutting machine 10 stems from its variable positioning and indexing mechanisms which precisely control the location and depth of each notch cut by a cutting blade 14. The machine design also accounts for ergonomic principles making it simple to cut keys for locks produced by the gamut of key-lock manufacturers. A locksmith only needs to change a pair of indexing templates, if that, when switching from one manufacturer's code to that of another.

Advantageously, the indexing mechanism separates the indexing of notch location and notch depth, thus enabling the separate control of each parameter. In addition, the indexing mechanism may be initialized according to any lock manufacturer's specification. As stated above, lock manufacturers typically select random positions for a first notch location and a notch depth zero-position. The indexing system is capable of adjusting its initial positions to accommodate the myriad of unique first notch locations and unique notch depth zero-positions. Consequently, the code key cutting machine 10 can cut keys according to virtually any lock manufacturers' code.

The code key cutting machine 10 additionally includes a notch profile tracing mechanism 15, which allows the cutting blade 14 to carve a variety of notch shapes according to a selected notch profile template 16. The locksmith need only change the notch profile template 16 to produce differently shaped notches instead of changing cutting blades 14; a procedure that is vastly simpler and quicker as will be described below.

Referring to FIG. 1, the code key cutting machine 10 includes a notch location indexing mechanism 30 to control the location of each notch cut by the cutting blade 14. The notch location indexing mechanism 30 includes a key carriage 38 supporting a clamp 28. By turning a space crank 176, the key carriage 38 moves transversely relative to the plane of the cutting blade 14 to position the desired portion of a key blank secured in the clamp 28 in line with the cutting blade 14.

Linear movement of the key carriage 38 transverse to the cutting blade 14 is indicated by rotation of a space dial 36. The extent of rotation of the space dial 36 corresponds to the extent of travel of the key carriage 28. The space dial 36, however, can rotate without moving the key carriage 38, thus enabling positioning of the space dial 36 to any initial position without moving the key carriage 38.

The code key cutting machine also includes a motor carriage 46 which supports the cutting blade 14. The motor carriage 46 is moved transversely relative to the key carriage 38 by turning the depth crank 84. In this manner, the cutting blade 14 is positioned relative to the key blank 12 secured in the clamp 28 to control the depth of each notch cut by the cutting blade 14.

Similar to the key carriage 38, linear movement of the motor carriage 46 is indicated by rotation of a depth dial 34. The extent of rotation of the depth dial 34 corresponds to the extent of travel of the motor carriage 46. The depth dial 34, however, can rotate without moving the motor carriage 46, thus enabling positioning of the depth dial 34 to any initial position without moving the motor carriage 46.

Figure 2:
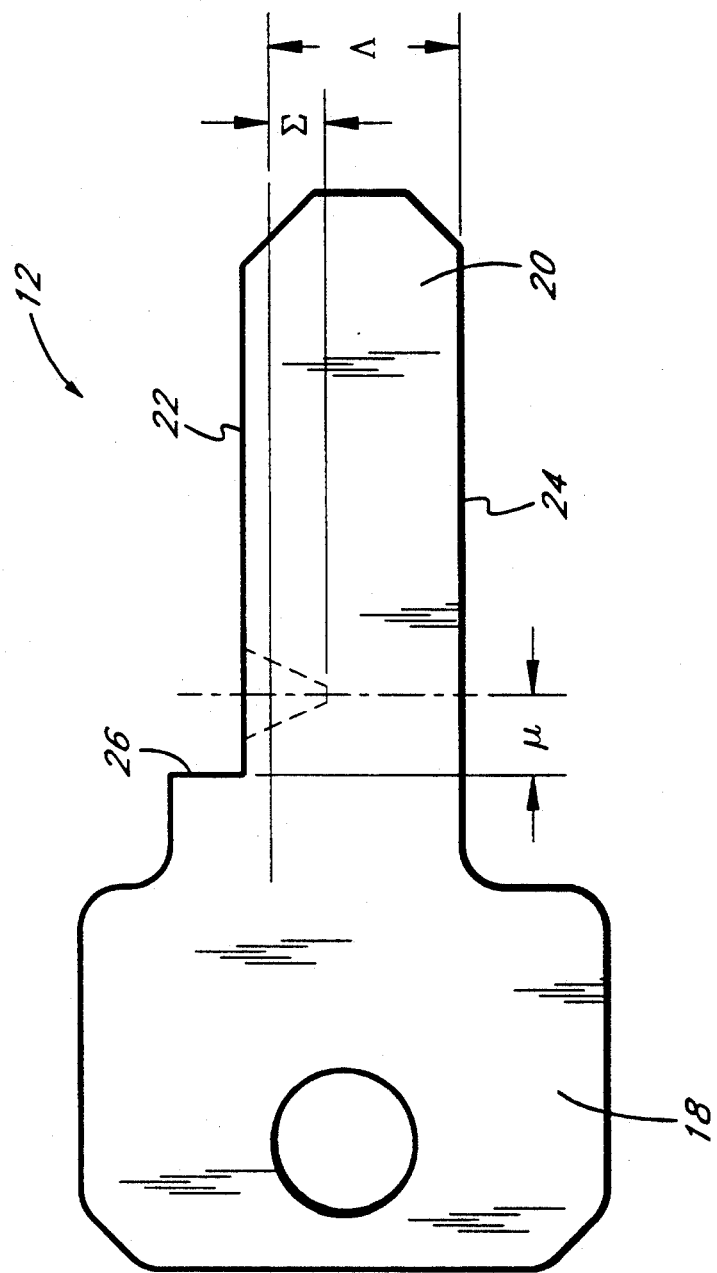
FIG. 2 is a elevational view of a key blank used with the code key cutting machine of FIG. 1.

For the purpose of illustration, FIG. 2 shows a common key blank 12 preferably used with the code key cutting machine 10. The key blank 12 has a wider apertured head 18 for gripping and an elongate shank 20 which is notched for interaction with the tumblers of a lock. The shank includes a working edge 22 and a nonworking or rear edge 24. Conventionally, notches are cut into the working edge 22 of the key blank 12 distanced from a raised shoulder 26 which defines the interface between the head 18 and the shank 20. A first notch is distanced from the shoulder by a first-notch-to-shoulder distance $\mu$ and the depth of each notch $\Sigma$ is measured from a notch depth zero-position $\Lambda$ which itself is defined by a given distance from the rear edge 24. It is understood, however, that those skilled in the art will appreciate that the code key cutting machine 10 can be readily adapted for use with other less conventional key blank configurations.

Broadly defining the use of the code key cutting machine 10 to cut a key blank 12 (see FIG. 2), a locksmith first inserts the key blank 12 into the clamp 28. With the key blank positioned to expose its working edge 22 (see FIG. 2), the locksmith tightens the clamp 28 to secure the key blank 12 in place.

Referring to FIG. 1, the locksmith turns the space crank 176 to move the key carriage 38 to the left of the cutting blade 14 to an initial position abutting the key carriage 38 against an adjustable stop 146. Preferably, the initial position is a set distance from the cutting blade 14.

Similarly, the locksmith initializes the motor carriage position by turning the depth crank 84 to move the motor carriage 46 towards the rear of the cutting machine 10. The motor carriage 46 stops at an initial position abutting an adjustable stop 94 (see FIG. 4) against a portion of the base 44. The motor carriage initial position is preferably set from the clamp 28 by a specific distance.

The locksmith selects a space index template 202 and a depth index template 212, each having indexing marks corresponding to a specific key-lock manufacturer's code as to depths and locations of the notches of a unique key. The locksmith places each template 202, 212 on the respective dials 34, 36 in a keyed position. The locksmith then positions the dials to align an initial index mark 208, 218 (see FIGS. 9 and 10) on each template 202, 212 with a datum 248 on an indexing block 42 supporting the dials 34, 36. Importantly, neither carriage 38, 46 moves as the locksmith adjusts the dials 34, 36.

The locksmith also selects a notch profile template 16 corresponding to a specific notch profile dictated by the key-lock manufacturer. The locksmith inserts the notch profile template 16 within a template cradle 96 and secures it in place.

From the initial position, the locksmith moves the key carriage 38 to the right by turning the space crank 176 to place the key blank 12 in a first position relative to the cutting blade 14. As the key carriage 38 moves, the space dial 36 rotates. The locksmith continues turning the space crank 176 until a first index mark 210 (see FIG. 9) on the space dial 36 aligns with the datum 248, indicating that the key blank is located at the first position.

Figure 5:
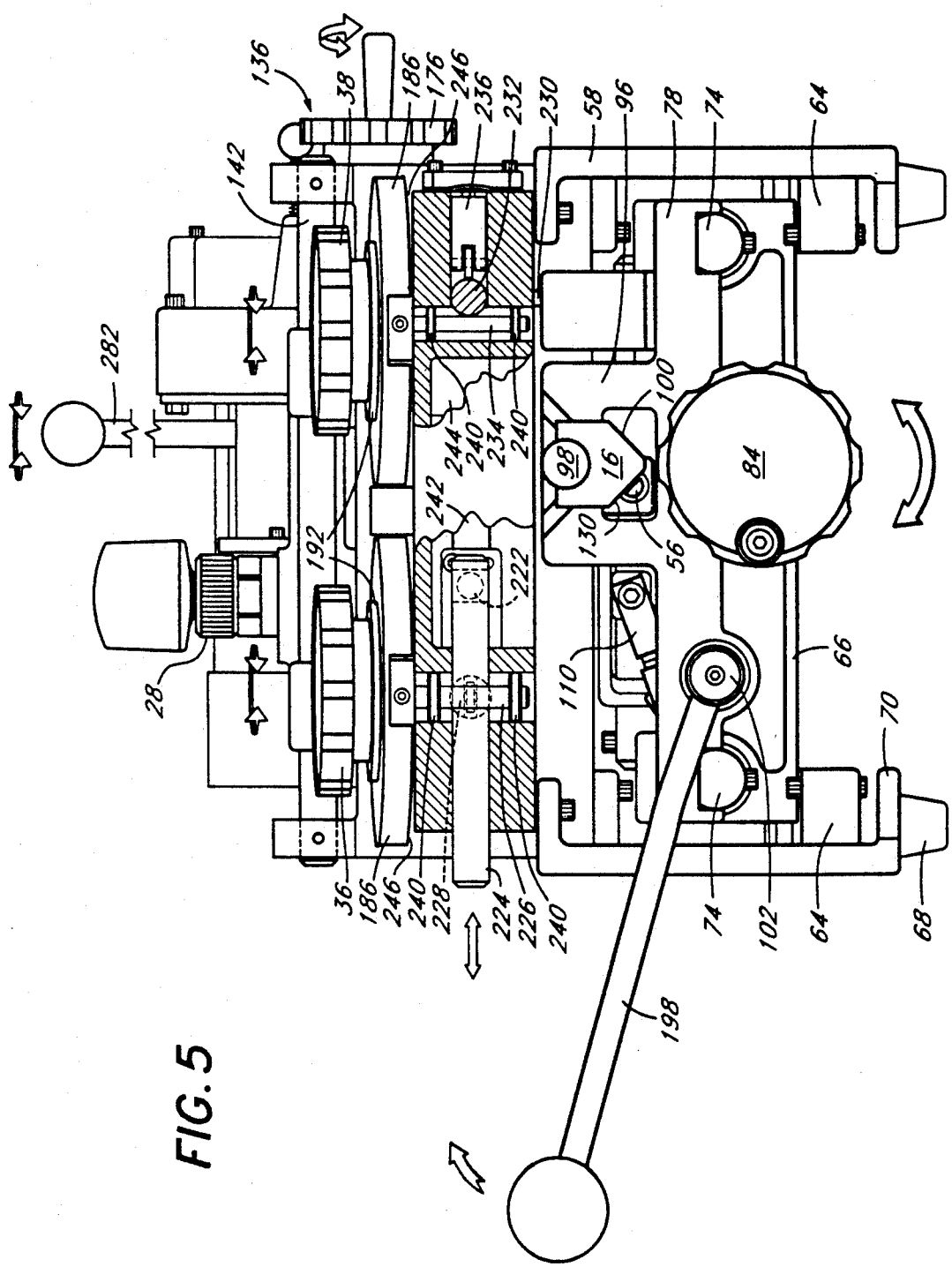
FIG. 5 is a partially cut-away front elevational view of the code key cutting machine of FIG. 1.

The locksmith then rotates the depth crank 84 to move the motor carriage 46 forward, thus moving the cutting blade 14 towards the key blank 12. As used herein, "forward," "rearward," "front" and "rear" are in relation to a front end of the code key cutting machine 10, as illustrated in FIG. 5. The depth dial 34 rotates as the motor carriage 46 moves. The locksmith continues rotating the depth crank 84 until a specific index mark 216 (see FIG. 10) on the depth dial 36 aligns with the datum 248. In this position, the cutting blade 14 is properly located from the key blank working edge 22 to cut a notch of the desired depth.

Having placed the cutting blade 14 at a position to cut a notch at a specific location and depth, the locksmith grabs a knob 106 of the lever arm 108, and rotates it to the right, as schematically shown in FIG. 1. Rotation of the lever arm 108 causes a stylus shaft 56 to contact a profile edge surface 100 of the notch profile template 16 and to trace along the profile of the notch template 56. As the stylus shaft traces the profile of the notch template 56, the cutting blade 14 rocks into contact with the key blank working edge 22 and simultaneously moves along the working edge 22. The extent of transverse movement of the cutting blade 14 into the key blank 12 and the extent of longitudinal movement of the cutting blade 14 along the working edge 22 coincides with the movement of the stylus shaft 56 along the profile of the notch template 56. In this manner, the cutting blade 14 cuts a notch profile coinciding with the profile traced by the stylus shaft 56.

After cutting the notch, the locksmith moves the motor carriage 46 back to the initial by rotating the lever arm 108 back to the left. Subsequently, the locksmith moves the key carriage 38 to the left to a point where a second index mark 206 (see FIG. 9) of the space dial aligns with the datum 248. The locksmith cuts a second notch at this location by repeating the steps of positioning the motor carriage 46 at a proper position to cut the desired notch depth and of cutting the notch by moving the lever arm 108 to the right and then back to the left.

A series of notches is cut by repeating the steps outlined in the preceding paragraphs to produce a unique key according to a specific key-lock manufacturer's code. The individual components of the code key cutting machine 10 will now be described in detail.

THE BASE

Figure 3:
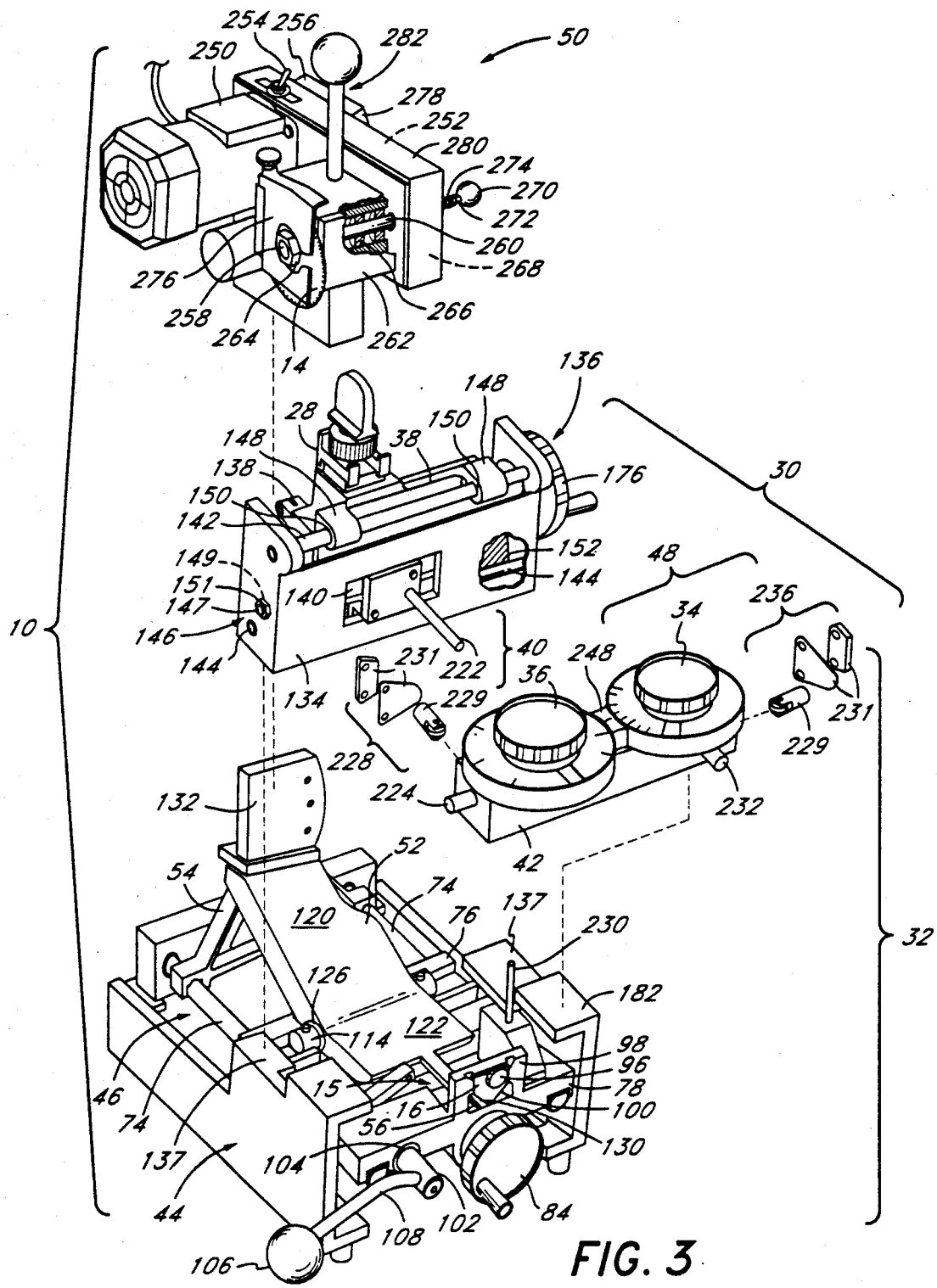
FIG. 3 is an partially exploded perspective view of the code key cutting machine of FIG. 1.
Figure 4:
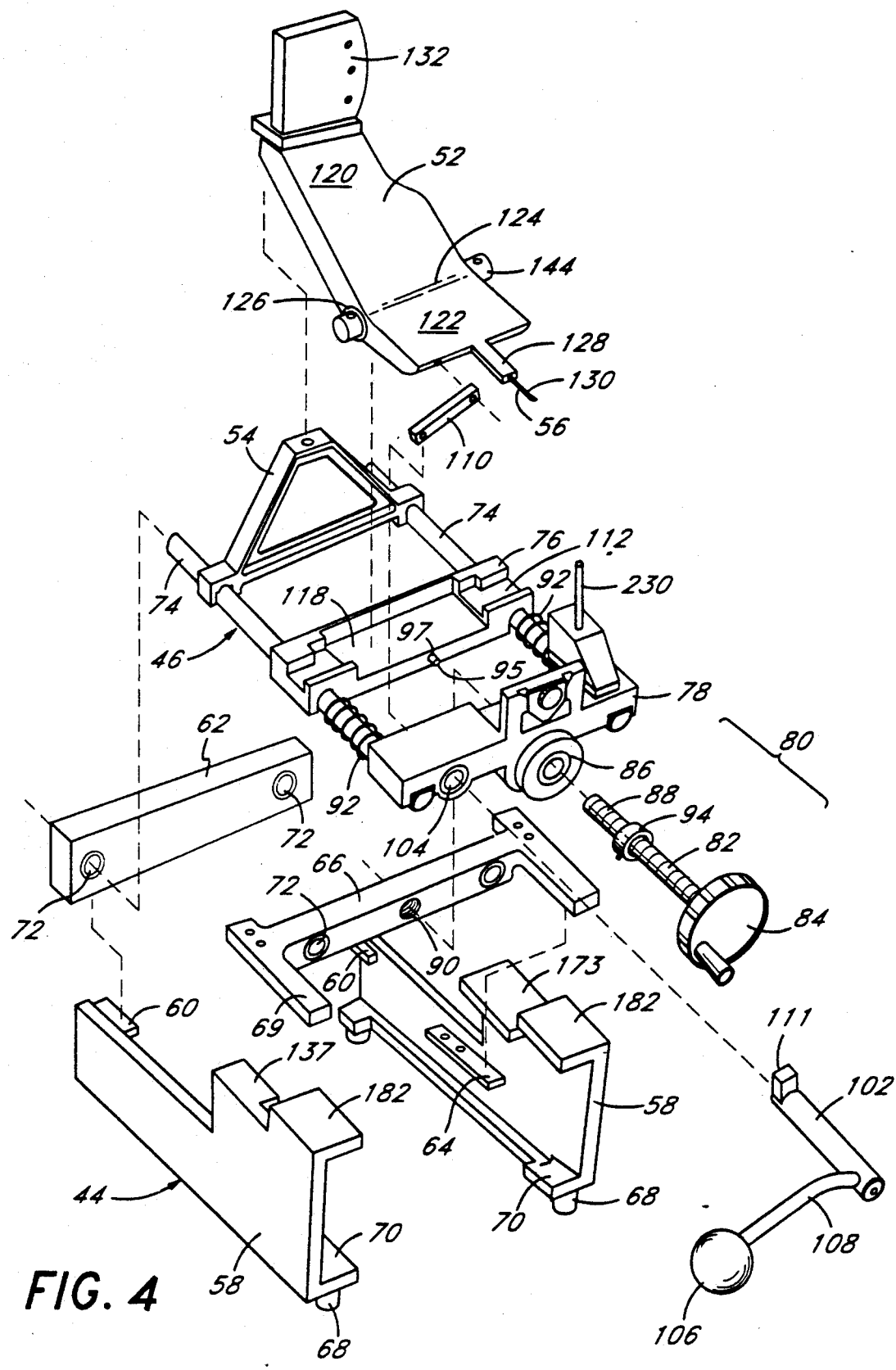
FIG. 4 is an exploded perspective view of a base and a motor carriage of the code key cutting machine of FIG. 3.

Referring to FIGS. 3 and 4, the base 44, which supports the notch location mechanism 30, the notch depth indexing mechanisms 32, the notch tracing mechanism 15 and the cutting blade 14, includes a pair of base supports 58 having generally rectangular bodies with supporting flats extending normal to the body. The base supports 58 are formed of machined aluminum foundry castings or aluminum die castings.

A pair of rear flats 60 support a rear support block 62 and pair of front flats 64 support a front support block 66, as seen in FIG. 4. The front support block 66 preferably includes sufficiently sized mounting flanges 69 to support the motor carriage 46 as a rocker carriage 52 rocks in the forward direction, as described in detail infra. In addition, the base 44 preferably includes four rubber feet 68 supported by bottom flats 70.

The rear support block 62 and the front support block 66 each include a pair of bushings 72. In assembly, pair of bushings from the respective blocks 62, 66 are coaxially aligned.

THE MOTOR CARRIAGE

Figure 6:
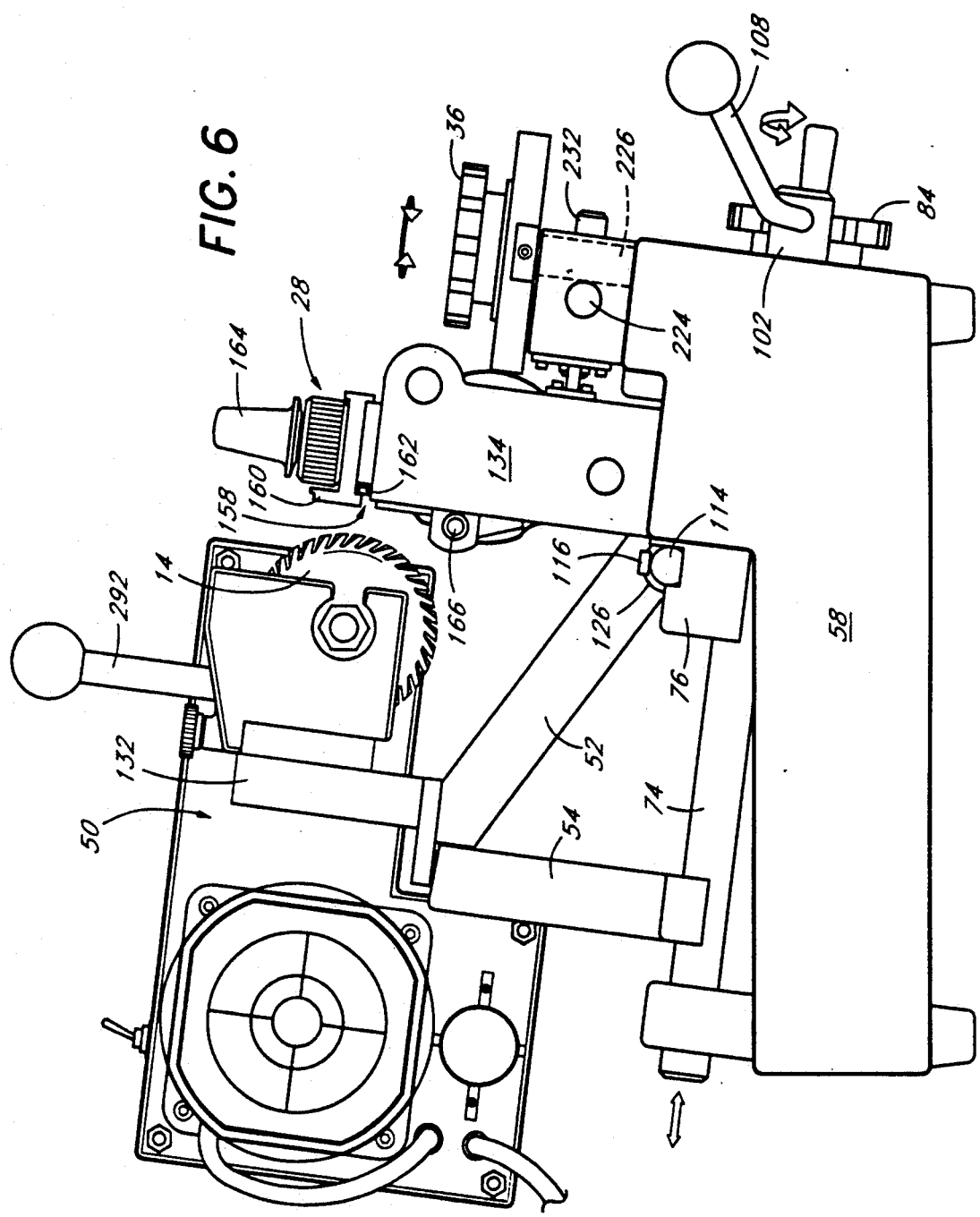
FIG. 6 is a side elevational view of the code key cutting machine of FIG. 1.

The motor carriage 46 includes two parallel spaced steel shafts 74 supporting a rear support bracket 54, a rocker carriage support block 76 and a template carriage 78, as illustrated in FIGS. 3 and 4. The motor carriage shafts 74 have a diameter slightly less than the internal diameter of the bushings 72 of the front support block 66 and rear support block 62 to slide through the bushings 72 in a slip-fit fashion. As best seen in FIG. 6, the shafts 74 preferably incline with respect to the base 44 towards the rear of the code key cutting machine 10.

Referring to FIG. 4, the template carriage 78 carries a motor carriage travel mechanism 80 which includes a worm gear shaft 82 connected to the depth crank 84. A carriage bushing 86, passing through the template carriage 78, supports an end the worm gear shaft 82 proximate to the depth crank 84. A threaded rear end 88 of the worm gear shaft 82 meshingly engages a threaded aperture 90 in the front support block 66 of the base 44. In assembly, rotation of the depth crank 84 rotates the worm gear shaft 82 and moves the motor carriage 46 relative to the base 44 and transverse to the key carriage 38 supported by the base 44. Two helical compression springs 92 are positioned on the motor carriage shafts 74 between the front block 66 and the template carriage 78 and bias the motor carriage towards the front of the code key cutting machine to compensate for tolerance slop in the assembly.

Preferably, the motor carriage travel mechanism 80 also includes a pair of adjustable stops, as shown in FIG. 4, to restrict the extent of travel of the motor carriage 46 relative to the base 44. One stop 94 includes an annular collar that attaches onto the worm gear shaft 82 and abuts against the front side of the front block 66 to prevent further rearward movement of the motor carriage 46. The other stop 95 includes a threaded shaft that meshingly engages a threaded aperture 97 in the rocker carriage support block 76 and abuts against the rear side of the front support block 66 to prevent further forward movement of the motor carriage 46.

Referring to FIG. 3, at the lower right front of the code key cutting machine 10, the template carriage 78 includes the template cradle 96 framing the notch profile template 16 removably secured in place by a template clamp 98. The notch template 16 has a distinctive profile proportionally corresponding to a notch profile specified by a specific lock manufacturer and defined by a profile edge surface 100. Preferably, the notch template profile and the desired notch profile have a one to one correspondence, and the notch template has a sufficient height to produce the desired depth.

Still referring to the template carriage 78 shown in FIG. 3, a crank shaft 102 supported by a support bushing 104 passes through the template carriage 78 and connects with a knob 106 via a leverage arm 108. The leverage arm 108 has a sufficient length to permit the crank shaft 102 to be easily rotated with little force on the knob 106. As shown in FIG. 4, the rear end of the crank shaft 102 connects to the rocker carriage 52 by a linkage 110 which causes the rocker carriage 52 to move linearly and generally parallel to the notch template 16 as the crank shaft 102 rotates. The linkage 110 is preferably rotatably connected to the circumference of the crank shaft 102 at one end and rotatably connects to the rocker carriage 52 at the other end by means known in the art. As a result, rotation of the crank shaft 102 through an angle $\theta$ will linearly displace the linkage 110, and thus the rocker carriage 52, by an amount proportional to the cosine of angle $\theta$. Preferably, the extent of travel of the rocker carriage 52 resulting from 90° of crank shaft rotation is greater than the frontal width (i.e., the width from side to side) of the notch template 16, and thus the radius of the crank shaft 102 is larger than the notch template 16 frontal width. More preferably, as schematically illustrated in FIG. 4, an extender 111 is rigidly affixed to the rear end of the crank shaft 102 to effectively extend the radius of the crank shaft 102. The opposite end of the extender 111 rotatably couples with the linkage 110. Consequently, a smaller radius crank shaft 102 can produce the desired travel of the rocker carriage 52 when used with the extender 111.

As best seen in FIG. 4, the rocker carriage support block 76 has a generally rectangular shape with a channel 112 disposed along the longitudinal axis of the support block 76. A fulcrum shaft 114 sits within the channel 112 with a pair of pins 116 (see FIG. 3) securing the fulcrum shaft 114 in place. The support block 76 also includes a generally square relief 118 symmetrically positioned about the support block 76.

The fulcrum shaft 114 supports the rocker carriage 52 which sits in the square relief 118 of the support block 76 in assembly, as shown in FIG. 3. The rocker carriage 52 comprises a incline arm 120 and a forward arm 122 connected via a bend area 124. Preferably, an oblique angle is formed between the incline arm 120 and the forward arm 122, and more preferable the formed angle equals about 120°.

The rocker carriage 52 additionally includes a bushing 126 which receives the fulcrum shaft 114 in a slip-fit fashion to permit the rocker carriage 52 to pivot about the fulcrum shaft 114 and to slide along the fulcrum shaft 114. Preferably, the width of the rocker carriage 52 is smaller than the distance between the pins 116 by an amount greater than the frontal width of the notch profile template 16.

A stylus arm 128 cantilevers from the front end of the forward arm 122 to suspend the stylus shaft 56. The stylus shaft 56 preferably has a flat surface 130 to engage the profile edge surface 100 of the notch template 16. The stylus shaft 56 rotatably connects to the stylus arm 128 to maintain flush contact between the stylus shaft flat surface 130 of the stylus shaft 56 and the profile edge surface 100 as the rocker carriage 52 slides along the fulcrum shaft 114.

As shown in FIGS. 3 and 4, the rear support bracket 54, generally having a triangular shape, supports the rear end of the rocker carriage 52 in an idle position. The rear end of the incline arm 120 supports a motor position plate 132 which couples with the motor assembly 50 (see FIG. 3) as described in detail below. In assembly, the weight of the motor assembly 50 biases the rocker arm 52 against the rear support bracket 54.

THE KEY CARRIAGE ASSEMBLY

Referring to the center of FIG. 3, the key carriage assembly includes the key carriage 38, the clamp 28, a key carriage support block 134 and a key carriage travel mechanism 136. The key carriage support block 134 mounts onto the base 44 on a pair of key carriage support flats 137, and supports the key carriage 38 and the travel mechanism 136.

The key carriage support block 134 has a generally parallelepiped shape including a recess 138 adapted to receive the key carriage 38 and an aperture 140 in a front side. The key carriage support block 134 additionally includes a pair of parallel, generally horizontal shafts 142, 144 which support the key carriage 38 and define its path of movement, transverse to the cutting blade 14 in assembly. Each shaft 142, 144 has an ample length to define sufficient key carriage travel to allow a key blank 12 secured in the clamp 28 to be positioned at any location along its working edge 22 relative to the cutting blade 14.

The key carriage support block 134 also includes two adjustable stops 146 positioned on diametrically opposite sides of the support block 134 to define stop positions for the key carriage 38 at either end of its linear travel. Each stop includes a threaded screw 147 meshingly engaging a threaded aperture 149 in the sides of the key carriage support block 134. One end of the threaded screw 147 has a flat, blunt surface and extends into the recess 138 of the carriage support block 134 to abut the key carriage 38. The opposite end of the threaded screw 147 has a recess to receive a standard Allen wrench to enable the screw 147 to be positioned relative to the threaded aperture 149 by rotating the screw 147. Preferably, the screw 147 extends beyond the side of the carriage support block 134 to engage a nut 151 to hold the screw 147 in a set position, as known in the art.

The key carriage 38 generally has a rectangular parallelepiped shape sized to fit within the similarly shaped recess 138 of the key carriage support block 134. The key carriage 38 couples with the upper shaft 142 by a pair of track arms 148 positioned on an upper side of the key carriage 38, as illustrated in FIG. 3. Each track arm 148 housing a bushing 150 receiving the upper shaft 142 in a slip-fit fashion to slide along the shaft 142. The key carriage 38 also includes a longitudinal groove 152 positioned on its bottom side and adapted to receive the lower shaft 144 with the key carriage 38 sitting upon the shaft 144. The key carriage 38 further includes a set of internal threads 154 opening into an internal cavity 156, as shown in FIG. 7.

As illustrated in FIG. 6, the clamp 28 includes a vice 158 having a stationary upper jaw 160 and a movable lower jaw 162 which moves relative to the upper jaw 160 when rotating a clamp knob 164, as known in the art. The clamp 28 is attached proximate to the rear side of the key carriage 38 to place the vice 158 proximate to the cutting blade 14 in assembly.

Figure 7:
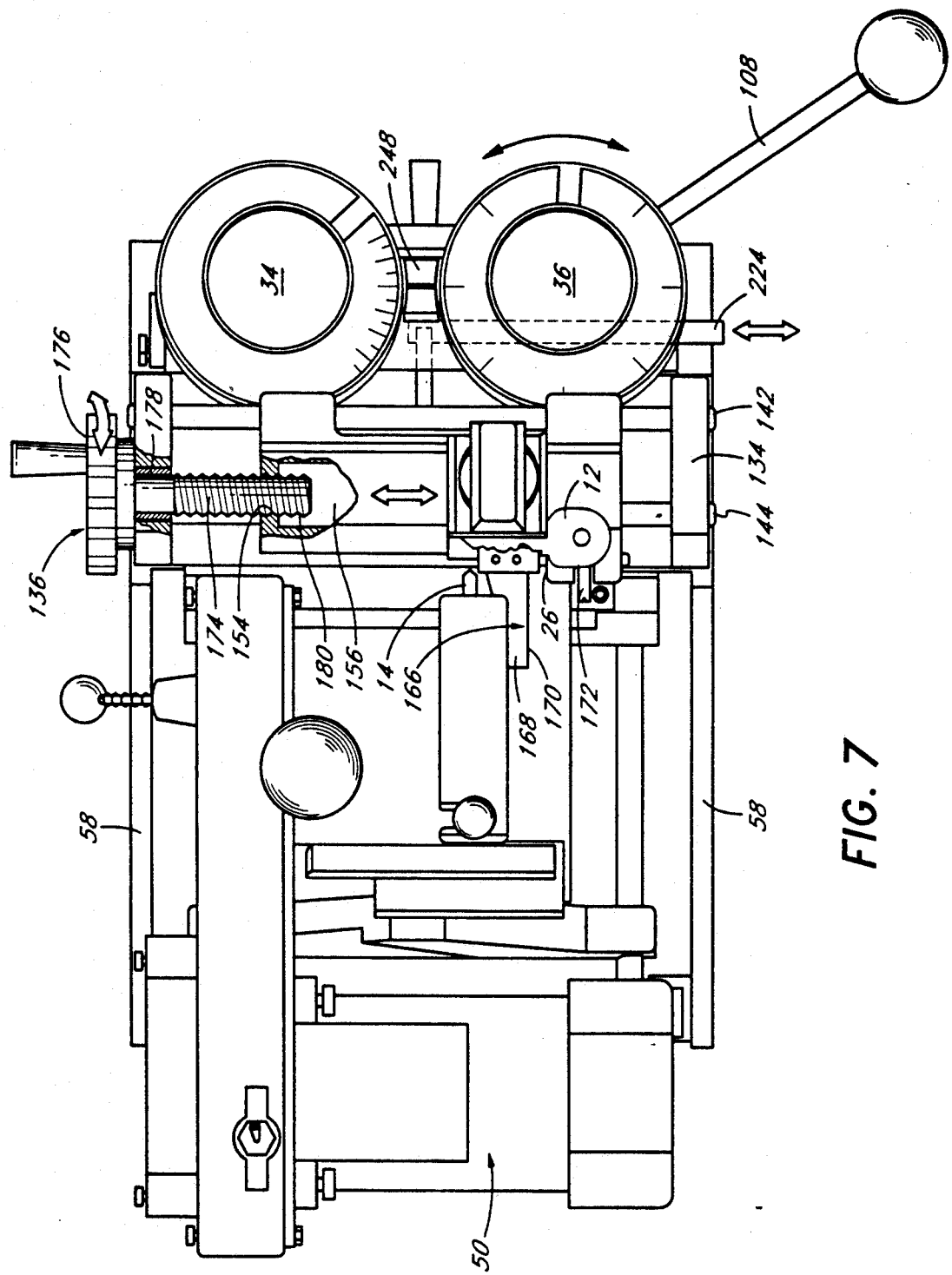
FIG. 7 is a partially cut-away top plan view of the code key cutting machine of FIG. 1 illustrating a partial cut away plan view of a key carriage.

Referring to FIG. 7, the key carriage 38 preferably includes a registering member 166 to orientate the shoulder 26 of a key blank 12 in a proper position within the vice 158, as known in the art. The registering member 166 includes a guide vane 168 having a corner 170 adapted to mate with the shoulder 26 of the key blank 12 and is preferably positioned below the clamp 28, as shown in FIG. 6. The guide vane 168 rotatably couples to the key carriage 38 to rotate out of the way of the cutting blade 14 when not in use. The registering member 166 also includes a gripping member 172 to aid in manually positioning the registering member 166.

Referring to FIG. 7, the key carriage travel mechanism 136 includes a worm gear shaft 174 connected to a space crank 176. A carriage support block bushing 178 supports an end of the worm gear shaft 174 proximate the space crank 176, as schematically illustrated in FIG. 7. An external threaded end 180 of the worm gear shaft 174 mates with the internal threads 154 of the key carriage 38. Rotation of the space crank 176 consequently rotates the worm gear shaft 174 and moves the key carriage 38 relative to the carriage support block 134 and transverse to the cutting blade 14 supported by the motor carriage 46. The internal cavity 156 freely receives the threaded end 180 of the worm gear as the key carriage 38 move towards the space crank 176.

THE INDEXING ASSEMBLY

The indexing assembly includes the space dial 36, the depth dial 34 and the linkages 40, 48 which couple the dials 36, 34 to their respective carriages 38, 46. The generally rectangular indexing block 42 supports the dials 34, 36 and linkages 40, 48 and mounts onto a pair of index block support flats 182 of the base 44, as shown in FIG. 3.

Figure 8:
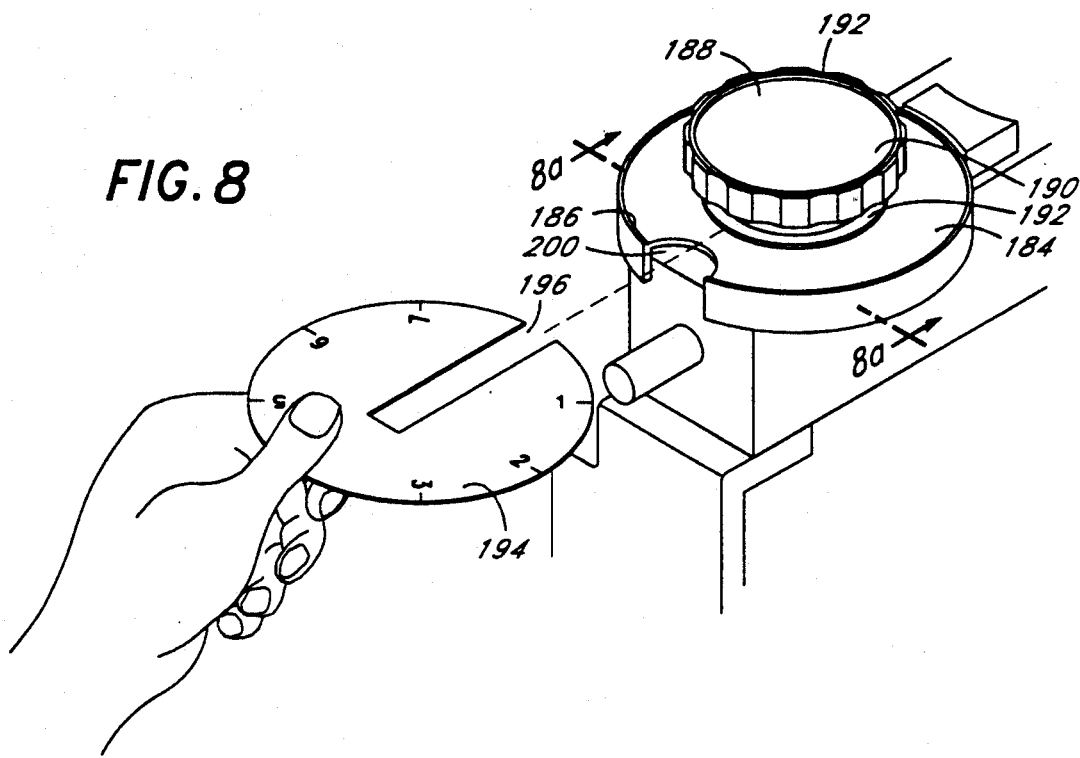
FIG. 8 is a partial view of the code key cutting machine of FIG. 1 schematically illustrating the insertion of a indexing template into a index dial.

Referring to FIG. 8, the dials 34, 36 each include a generally circular, flat dial surface 184 having a flange lip 186 disposed around the periphery of the dial surface 184. Each dial 34, 36 has a knob 188 with a flared head 190 positioned at the center of the dial surface 184. The flared head 190 includes a plurality of scallop reliefs 192 to enable the knob 188 to be easily griped. Disposed proximate to the dial surface 184 below the flared head 190, the knob 188 has an annular flange 192 positioned parallel to and suspended slightly above the dial surface 184.

Figure 8A:
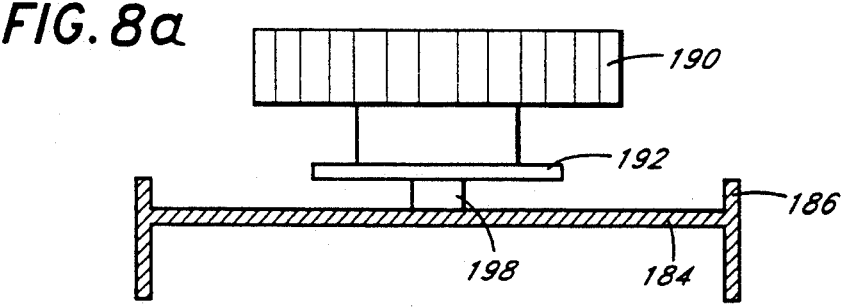

A plurality of templates 194 are used with the indexing mechanisms 30, 32 to precisely control the location and depth of each notch cut. The templates 194 have a generally circular shape with a slit 196 severing the template 194 between its center and its periphery, as illustrated in FIG. 8. The templates 194 are removably secured to the dial surface 184 by sliding the template 194 between the dial surface 184 and the annular flange 192 with the slit 196 receiving a stem 198 (see FIG. 8a) of the dial knob 188. The dial knob stem 198 has a generally rectangular cross section with a shorter side width generally equal to the width of the template 194 to key the template 194 in a set position. The template 194 has a size commensurate with the dial surface 184 and snugly fits within the flange lip 186. Preferably, the flange lip 186 includes a finger relief 200, as illustrated in FIG. 8, to enable easy insertion and removal of the template 194 from the dial 34, 36.

Figure 9:
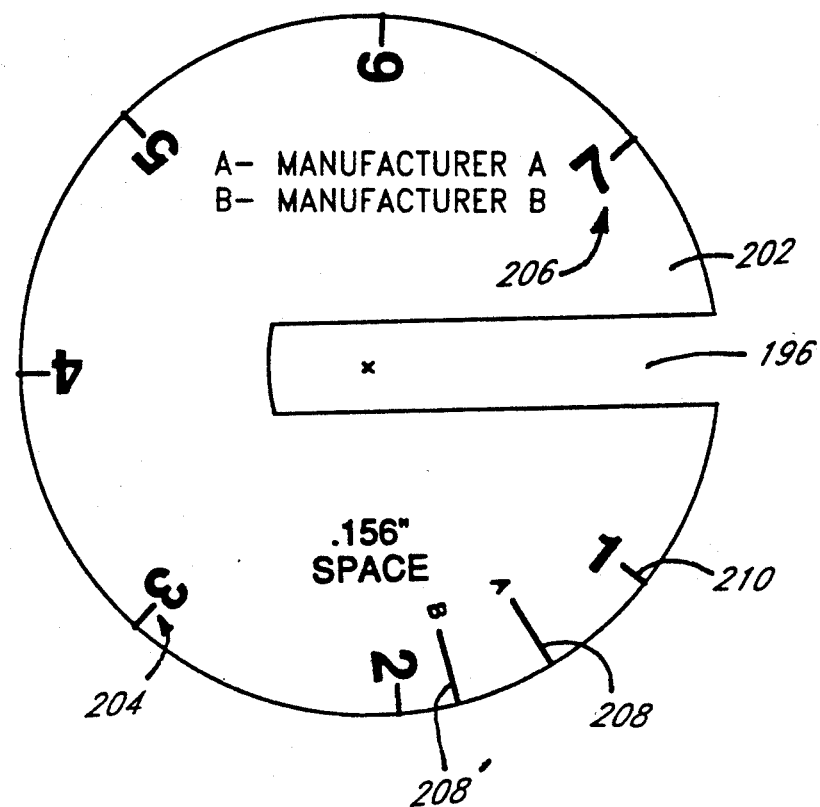
FIG. 9 is a plan view of a space template used with the code key cutting machine of FIG. 8.

Referring to FIGS. 8 and 9, a space dial template 202 is removably secured within the flange lip 186 of the space dial 36, as described. As shown in FIG. 9, the space dial template 202 includes a plurality of identifying index marks 204 (e.g., lines extending radially inward from the circumference of the template) and a series of magnitude identifying indicia 206 (e.g., numbers) corresponding to the identifying index marks 204. In order to appreciate the orientations of the identifying index marks 204 about the circumference of the space dial template 202, it is necessary to understand the placement of the key carriage 38, and thus the key blank 12, with respect to the cutting blade 14 during the notch cutting procedure.

Figure 15:
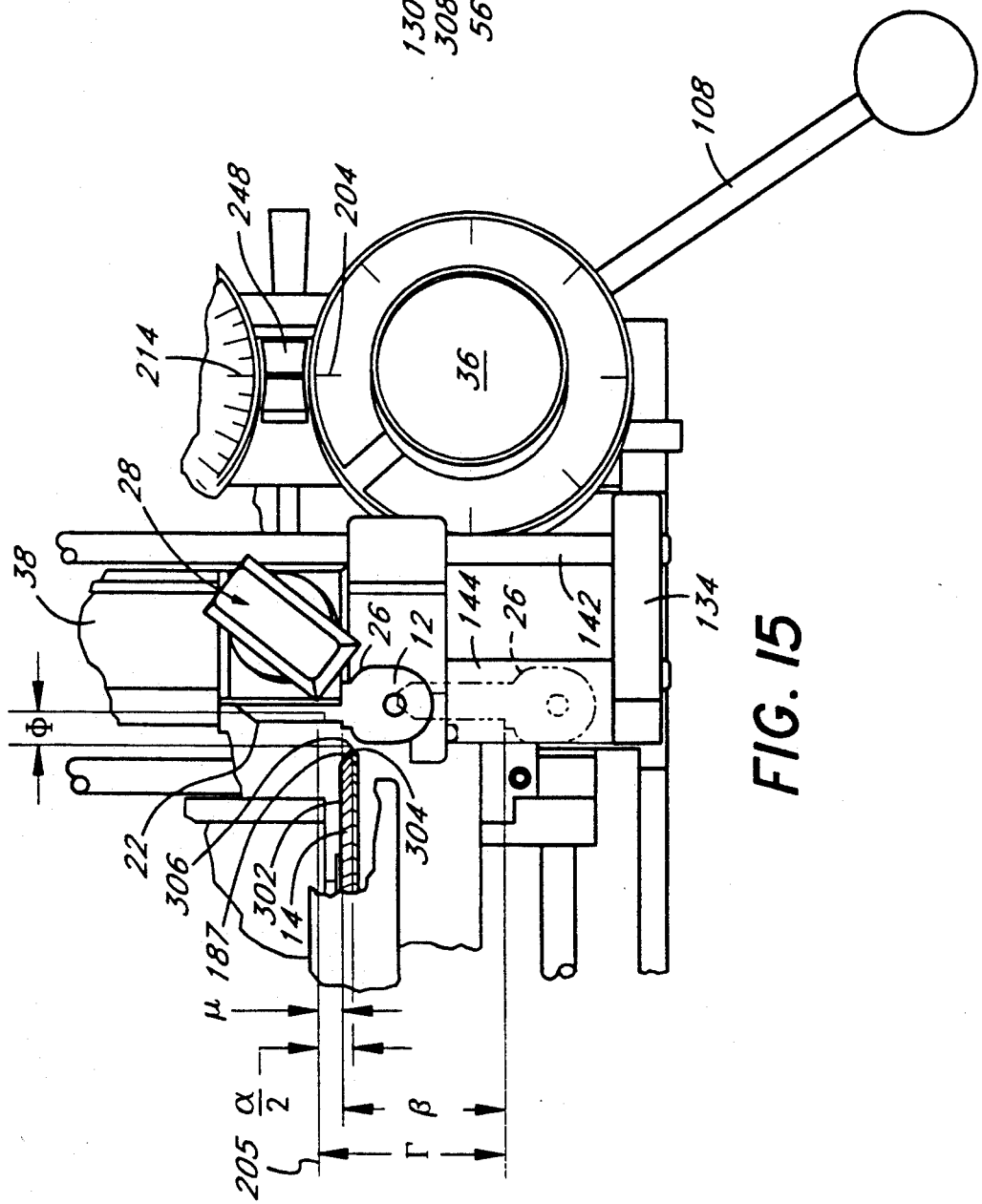
FIGS. 15 illustrates a partial plan view of the code key cutting machine of FIG. 1 illustrating a position of the cutting blade prior to cutting a notch.

Referring to FIG. 15, the cutting blade 14, in use, travels from an idle position to the right in a direction generally parallel to the key blank working edge 22 by a distance $\alpha$, as discussed in detail infra. A distance $\alpha/2$ represents the distance from a center-line 205 of a notch cut by the cutting blade 14 ("the cut center-line 205") to the cutting blade 14 in its idle position.

FIG. 15 illustrates the cutting blade 14 in the idle position and spaced from a first notch location on the key blank by the distance $\alpha/2$. As stated above, the first notch location is located from the key blank shoulder 26 by a dimension $\mu$ (i.e., the first-notch-to-shoulder distance) specified by a key-lock manufacturer. As illustrated in FIG. 9, the identifying indexing marks 204 on the space dial template 202 include a first index mark 210 which, when aligned with the datum 248, represents the placement of the key blank shoulder 26 in a position distanced from the cut center-line 205 by the dimension $\mu$.

The identifying indexing marks 204 also include an initialization index mark 208 positioned from the first index mark 210 by a distance proportionally corresponding to a distance of travel $\beta$ (FIG. 15), where $\beta$ equals the distance between the key blank shoulder 26 in an initial position (as shown in phantom lines in FIG. 15) and the key blank shoulder 26 in the position distanced from the cut center-line 205 by the dimension $\mu$. Preferably, the distance $\beta$ is sufficiently large to place the key blank 12 completely to the left of the cutting blade 14 in the initial position. Thus, the key blank 12 is inserted into the clamp 28 without interfering with the cutting blade 14, and this procedure occurs away from the cutting blade's sharp edge.

Referring to FIG. 9, the distance around the circumference of the space template dial 202, which proportionally corresponds to the dimension $\beta$, is plotted in the clockwise direction from the first index mark 210. For example, looking at the particular space dial template 202 illustrated in FIG. 9, this circumferential dimension is greater than one revolution around the space dial template 202, and is plotted in the clock-wise direction.

The balance of the identifying indexing marks 204 are sequentially plotted around the circumference of the space dial template 202 in uniform increments proportionally corresponding to the notch spacing increment selected by a key-lock manufacturer. The balance of the identifying indexing marks 204 are plotted from the first index mark 210 in the clockwise direction and represent each notch position specified by a key-lock manufacturer. For instance, the space dial template 202 of FIG. 9 includes the first notch index 210 and a series of six indexing marks 204; all seven identifying indexing marks 204 (including the first index mark 210) are equally spaced apart from one another and represent seven notch positions as specified by a key-lock manufacturer.

The notch location information for a number of key-lock manufacturers using the same notch spacing increment is preferably placed on a single space dial template 202. The space dial template 202 thus includes a plurality of initialization index marks 208 spaced from the first index mark 210, with each initialization index mark 208 corresponding to a specific key-lock manufacturer. The distance between the first index mark 210 and each initialization index mark 208 varies because the distance $\beta$ for each manufacturer is typically different. Again, this point is best understood through a discussion of the key blank 12 placement with respect to the cutting blade 14.

As seen in FIG. 15, a distance $\Gamma$ between the cut center-line 205 and the key shoulder in the initial position (shown in phantom line in FIG. 15) is a set dimension adjusted by the adjustable stop 146 on the left side of the key carriage support block 134. The distance $\beta$ equals the difference between the distance $\Gamma$ and distance $\mu$. The distance $\Gamma$ is empirically determined from the dimensions of the code key cutting machine 10 and the dimension $\mu$ is specified by a key-lock manufacturer. Because the distance $\mu$ specified by each manufacturer generally varies, the distance $\beta$ is generally different for each manufacturer. Thus, each initialization index mark 208 is typically spaced from the first index mark 210 by a distance different than the other distances between the first index mark 210 and the other initialization index marks 208.

For example, the space dial template 202 illustrated in FIG. 9 includes a second initialization index mark 208' which is spaced from the first index mark 210 by a greater distance than the distance between the first initialization index mark 208 and the first index mark 210. In this example, the first initialization mark 208 corresponds to a key-lock manufacturer A and the second initialization mark 208' corresponds to a key-lock manufacturer B. The dimension $\mu$ specified by manufacturer B is smaller than that specified by manufacturer A.

The distance $\beta$, therefore, is larger for manufacturer B than for manufacturer A, because the key carriage 38 needs to travel further from the set initial position to a point positioning the key blank shoulder 26 from the cut center-line 205 by the specified distance $\mu$. Thus, the second initialization index mark 208' is spaced from the first index mark 210 by a distance larger than the distance between the first index mark 210 and the first initialization mark 208.

The template 202 includes indicia adjacent to the initialization index marks 208 corresponding to specific manufacturers indicated by a chart placed on the template, as illustrated in FIG. 9. A number of manufacturers using codes with the same increment spacing between notch locations can be combined on one template, thus reducing the number of space templates 202 the locksmith must maintain. In addition, the templates 194 are readily exchangeable and non-breakable, thus making the cutting machine 10 more ergonomic and reliable.

Figure 10:
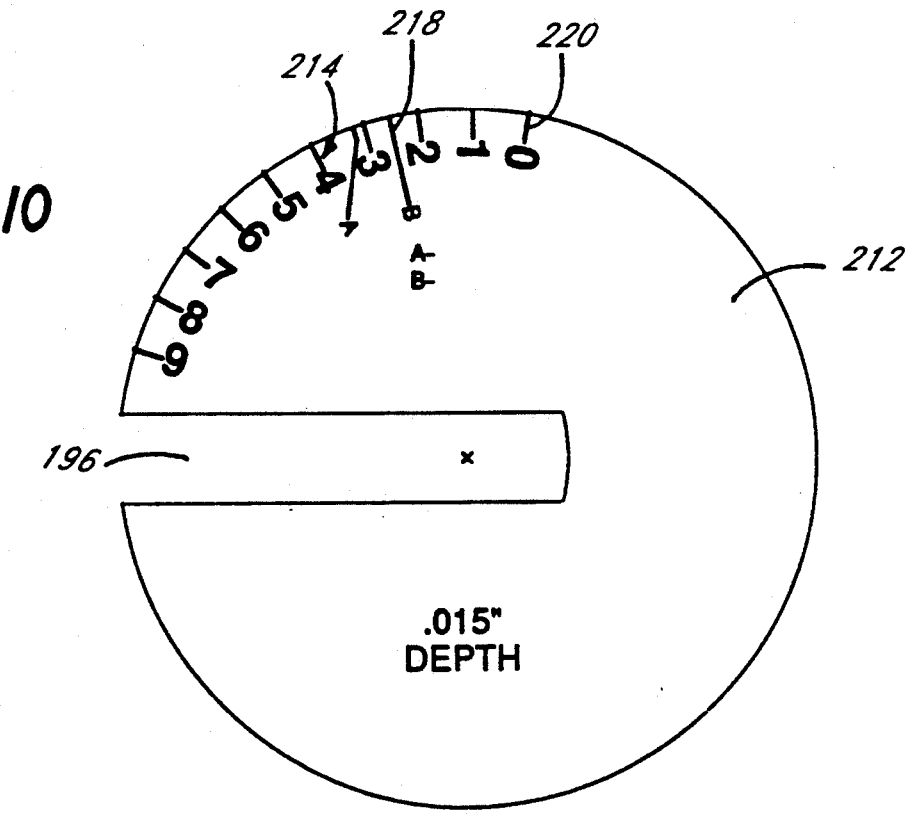
FIG. 10 is a plan view of a depth template used with the code key cutting machine of FIG. 8.

Referring to FIGS. 8 and 10, a depth template 212 is removably secured within the flange lip 186 of the depth dial 34, in a manner analogous to the securing of the space template 202. The depth template 212 includes a plurality of index marks 214, as shown in FIG. 10, spaced apart by an increment proportionally corresponding to a notch depth increment specified by a key-lock manufacturer and a series of magnitude identifying indicia 206 (e.g., numbers) identifying the number of increments spaced from the zero-position.

The index marks 216 include a first index mark 220 which represents the position of the cutting blade 14 from the rear edge 24 of the key blank 12 in a notch depth zero-position $\Lambda$ (see FIG. 2) specified by a key-lock manufacturer. When cutting a notch using the notch tracing mechanism 15, the cutting blade 14 travels forward from its idle position in a direction generally transverse to the key blank working edge 22 by a distance $\Phi$ (FIG. 15), as discussed in detail infra. The distance between the cutting blade 14 and the rear edge 24 of the key blank 12 with the cutting blade 14 at its zero-position, is preferably equal to $\Phi$ plus the notch depth zero-position distance $\Lambda$.

The index marks 214 also include an initial index mark 218 positioned from the first index mark 220 by a distance proportionally corresponding to a distance of travel $\Delta$ of the motor carriage 46 to place the cutting blade 14 from the rear edge 24 of the key blank 12 by the distance equal to the sum of the distances $\Phi$ and $\Lambda$. Preferably, the distance of travel $\Delta$ of the motor carriage 46 is greater than one half of a revolution of the dial template 212 to sufficiently space the cutting blade 14 in its idle position from the key blank 12 to avoid inadvertent cutting when positioning the key blank 12 about the cutting blade 14.

Similar to the space template 202, the depth template 212 preferably includes a plurality of initial index marks 218 spaced from the first index mark 220, with each initial index mark 208 corresponding to a specific key-lock manufacturer. The distance $\Delta$ for each manufacturer will typically be different from one manufacturer to another because the notch depth zero-position distance $\Lambda$ varies between each key-lock manufacturers. The template 212 include indicia adjacent to the initial index marks 218 corresponding to specific manufacturers indicated by a chart placed on the template, as illustrated in FIG. 10.

Referring to FIGS. 3 and 5, the space dial linkage 40 couples the key carriage 38 to the space dial 36 to transfer the linear movement of the key carriage 38 into rotational movement of the dial 36. Importantly the space dial 36 and the key carriage 38 are not rigidly affixed together, but are coupled by frictional contact. As a result, the dial 36 may be rotated without moving the key carriage 38 to position the dial 36 at any initial position.

Likewise, the depth dial linkage 48 couples the motor carriage 46 to the depth dial 34 to transfer the linear movement of the motor carriage 46 to into rotational movement of the dial 34. The linkage 48 couples the motor carriage 46 with the depth dial 34 through a frictional contact juncture to allow rotation of the dial 34 without moving the motor carriage 46.

The key carriage 38 and motor carriage 46 do not move with rotation of the respective dials 36, 34 because the inherent frictional forces in the carriage travel mechanisms 80, 134, are greater than the frictional forces between linkage components. The frictional forces counteracting the rotation of the dials 34, 36, however, are smaller than the frictional forces between the linkage components, and thus the dials 34, 36 rotate with movement of the carriages 38, 46.

The space dial linkage 40 includes a carriage shaft 222 connected to the key carriage 38 and positioned to extend generally perpendicularly to the key carriage support shafts 142, 144 through the carriage support block aperture 140. A linkage shaft 224, having a generally circular cross section, is fixed to the front end of the carriage shaft 222 and is positioned generally parallel to the key carriage support shafts 142, 144. The linkage 40 also includes a cylindrical spindle 226 (FIG. 5) which extends from the space dial 36 in a direction generally perpendicular to the dial surface 184 and to the linkage shaft 224. The spindle 226 and the linkage shaft 224 frictionally contact each other with a biasing member 228 forcing the two components 224, 226 together. Although the biasing member 228 shown in FIGS. 3 and 5 is a roller 229/leaf spring 231 assembly, it will be understood that other biasing mechanisms, such as a ball plunger, can be used as well.

Figure 21:
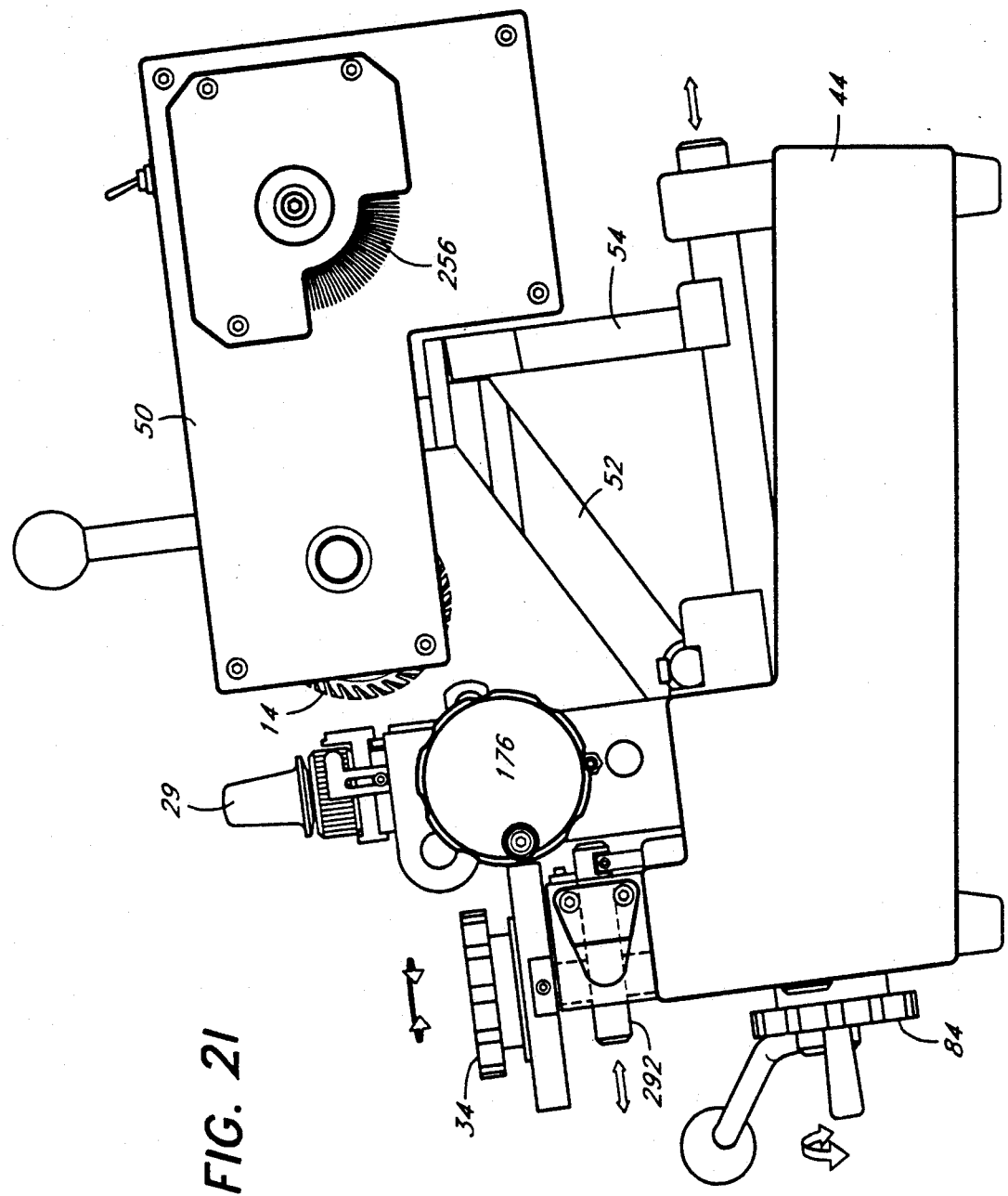
FIG. 21 is a side elevational view of the code key cutting machine of FIG. 1.

Similarly, the depth dial linkage 48 includes a carriage shaft 230 connected to the motor carriage 46 and positioned generally normal to the motor carriage support shafts 74, as schematically illustrated in FIG. 3 on the upper right of the base 44 - motor carriage 46 assembly. As best seen in FIG. 21, a linkage shaft 232, having a generally circular cross section, connects to an upper end of the carriage shaft 230 and is positioned generally parallel to the motor carriage support shafts 74. The linkage 48 also includes a cylindrical spindle 234 (FIG. 5) which extends from the depth dial 34 in a direction generally perpendicular to the dial surface 184 and to the linkage shaft 232. The spindle 234 and the linkage shaft 232 frictionally contact each other with a biasing member 236 forcing the two components 232, 234 together.

As shown in FIG. 5, the indexing block 42 includes two transverse holes 238 extending through the block 42. Each hole 238 houses a pair of ball bearings 240 sized to receive the spindles 226, 234 of the space dial 36 and the depth dial 34. The indexing block 42 also includes a plurality of bores to support the remaining linkage components in the orientations previously described, and schematically illustrated in FIG. 5. In addition, the indexing block 42 includes recesses 242, 244 sufficiently sized to allow the carriage shafts 222, 230 to move within the indexing block 42 as the carriages 38, 46 move relative to the indexing block 42.

On a top side, as seen in FIG. 5, the indexing block 42 includes a pair of diametrically opposed dial reliefs 246 having shapes commensurate with the shape of the indexing dials 34, 36. Referring to FIG. 3, at the center of the indexing block 42, a datum 248 is positioned for use with the index marks 204, 214 on the index templates 194 placed on the index dials 34, 36. The datum 248 acts as a reference point from which the extent of movement of each dial 34, 36 is assessed.

THE MOTOR ASSEMBLY

Referring to FIG. 3, the motor assembly 50 includes the cutting blade 14 driven by an electric motor 250 via a belt 252. Preferably, the motor 250 produces about 120 watts of power and connects to an electrical outlet by a conventional electrical coupling. An on-off electrical switch 254 controls the operation of the motor 250. The motor 250 also directly drives a polishing wheel 256 to debur the key blank 12 after cutting, as best seen in FIG. 21.

The cutting blade 14 mounts onto a threaded end 258 of a cutting blade shaft 260 supported by a shaft support block 262 via a nut 264. A pair of ball bearing 266 support the shaft 260 within the support block 262 to reduce friction on the rotating shaft 260. On an opposite end of the shaft 260, a pulley wheel 268 connects the shaft 260 to the belt 252 driven by the motor 250.

The motor assembly also includes a cutting blade shaft lock mechanism 270 which locks the shaft 260 in place to permit removal of the nut 264 securing the cutting blade 14. The shaft lock mechanism 270 includes a lock shaft 272 which engages the pulley wheel 268 off-center to prevent rotation of the pulley wheel 268, and thus the shaft 260, as known in the art. Preferably the shaft lock mechanism 270 also includes a helical compression spring 274 which biases the lock shaft 272 away from the pulley wheel 268 when not in use.

For safety purposes, the motor assembly 50 includes a blade cover 276 and a polishing wheel cover 278, each removably secured to the motor assembly 50 to permit the removal of the cutting blade 14 and polishing wheel 256, respectively. A belt guard 280 covers the belt 252 suspending between the pulley wheels 268 attached to the motor 250 and cutting blade shaft 260.

Referring to FIGS. 11-14, the cutting blade 14 is capable of variable positioning relative to the key blank working edge 22. For conventional keys, the cutting blade 14 is positioned generally perpendicular to the key blank working edge 22. More specifically, in assembly, the leading edge 281 of the cutting blade 14 is positioned generally perpendicular to the working edge 22 of the key blank 12 secured in the clamp 28, as illustrated in FIGS. 11 and 15. For security keys, the cutting blade 14 rotates to an oblique position relative to the key blank working edge 22 as illustrated in FIGS. 13 and 14.

In assembly, the shaft support block 262 rotatably connects to the motor position plate 132. The positioning of the cutting blade 14 is controlled by a tilt mechanism 282. As schematically illustrated in FIG. 12, the tilt mechanism 282 includes the motor position plate 132 having three hemispherical dimples 284 located at various positions and a dual ball bearing plunger assembly 286 supported within a horizontal bore 288 of the shaft support block 262. Preferably, the angle defining an arc between each dimple 284 equals about 20°. The shaft support block 262 also includes a shaft bore 290 extending from an upper surface into the support block 262 and positioned generally perpendicular to the horizontal bore 288 housing the ball plunger 286.

As shown in FIG. 12, a release shaft 292 extends down into the shaft bore 290 and includes a relief 294 along its periphery edge positioned at the location of the horizontal bore 288 to receive a first ball bearing 296 forced by a spring 298 into the relief 294, with a second ball bearing 300 positioned within the horizontal bore 288. Consequently, the shaft support block 262 can rotate relative to the motor position plate 132 to a desired position where one of the dimples 284 receives a portion of the second ball bearing 300.

The motor assembly 50 is locked in a set position by rotating the release shaft 292 by about 180° such that the first ball bearing 296 is displaced out of the relief 294, rests against the outer diameter of the release shaft 292 and generally fills the horizontal bore 288. As a result, the spring 298 is generally fully compressed and thereby locks the second ball bearing 300 in the hemispherical dimple 284 of the motor position plate 132, preventing the motor assembly 50 from moving from the set position.

As best shown in FIG. 15, the cutting blade 14 has a kerf sufficiently sized to form the desired notch profile and more preferably has a kerf less than the width of the notch profile. The cutting blade 14 has a generally v-shaped cutting edge formed by two inclined cutting surfaces 302, 304. An apex 306 of the cutting blade 14 is preferably offset from a centerline of the kerf away from the front edge 281 of the cutting blade 14. The incline cutting surface 302 formed between the apex 306 and the leading edge 281 preferably has an angle of incline greater than the incline angle of the desired notch profile. Consequently, the cutting blade 14 can cut a variety of notch profiles when guided by the notch tracing mechanism 15, as will be described below.

It is understood, however, that blades having differing cutting blade configurations, such as, for example, a square blade, may be used as well with the code key cutting machine 10.

The cutting blade 14 is constructed of a hard metal alloy, such as stainless steel or the like.

METHOD OF USE

Elaborating on the previous description for using the code key cutting machine 10 to cut keys according to a specific key-lock manufacturer's code, the locksmith begins by initializing the cutting machine 10. Using the depth crank 84, the locksmith rotates the worm gear 82 of the motor carriage travel mechanism 80 to position the motor carriage 46 in an initial position toward the back of the machine 10. The front stop 94 of the motor carriage 46 contacts the front support block 66 and stops the motor carriage 46 at the initial position.

The key carriage 38 is likewise positioned in an initial position by using the space crank 176. The locksmith rotates the space crank 176 to turn the worm gear shaft 174 which moves the key carriage 38 to the initial position to the left of the cutting blade 14 where the key carriage 38 abuts the left positioning stop 146. It is contemplated, however, that the initial position can be to the right of the cutting blade 14 where the key shoulder 26 is positioned on the right side of the cutting blade 14.

The locksmith inserts a key blank 12 into the clamp 28, positioning the non-working edge 24 flush against a back wall of the clamp 28 and orientating the key blank 12 within the clamp 28 using the registering mechanism 166. The locksmith rotates the guide vane 168 to a position proximate to the key blank 12 and aligns the key shoulder 26 with the guide vane corner 170, as known in the art. With the key blank 12 set in the proper position, the locksmith tightens the jaws of the clamp 28 by turning the clamp knob 164, and rotates the registering mechanism 166 downward, out of the way. Secured within the clamp 28, the working edge 22 of the key blank 12 is exposed to the cutting blade 14, as schematically illustrated in FIG. 15.

The locksmith selects a space index template 202 and a depth index template 212 corresponding to the specifications of a specific key-lock manufacturer and inserts the templates 202, 212 into the respective indexing dials 36, 34. The locksmith subsequently adjusts the dials 34, 36 to align the initial index marks 208, 218 of the index templates 202, 212 with the datum 248, as shown in FIG. 15. The respective carriages 38, 46 do not move during this procedure.

From the initial position, the locksmith moves the key carriage 38 to a first position by rotating the space crank 176, which in turn rotates the worm gear 174 and draws the key carriage 38 to the right along its helical spline. As shown in FIG. 15, in the first position the shoulder 26 of the key blank 12 is positioned to the right of the cutting blade 14 by the distance Γ. In the first position, the first index mark 210 of the space dial template 202 aligns with the datum 248, thus indicating when the key carriage 38 has been placed in the desired first position.

The locksmith moves the motor carriage 46 from its initial position to a position generally corresponding to the desired depth position. If, for example, the specified depth of the notch at the first notch location position is three depth increments from the zero-position, the motor carriage 46 is positioned in a position corresponding to a position to cut into the key blank 12 by three depth increments, measured for the notch depth zero-position Λ, when added with the cutting blade travel Φ. Preferably, the cutting blade 14 in this position is proximate to, but does not cut into, the key blank 12, as illustrated in FIG. 15.

With the motor carriage 46 so positioned, the index mark 216 corresponding to the desired depth increment aligns with the datum 248. To continue with the above example, an index mark 216 corresponding to three dimensional increments from the zero-position 220 aligns with the datum 248 and indicates when the motor carriage 46, and thus the cutting blade 14, is positioned to cut a notch of the desired depth.

The locksmith selects a distinctive notch profile template 16 corresponding to a notch profile specified by the specific key-lock manufacturer, and secures it in the template cradle 96 by clamping the notch template 16 between the template cradle 96 and the template clamp 98.

Figure 16:
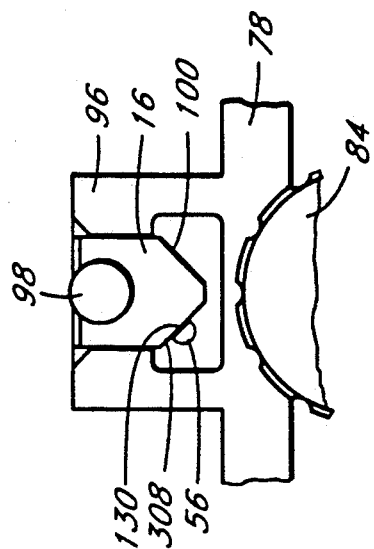
FIG. 16 is a partial elevational view of the code key cutting machine of FIG. 1 illustrating the position of a stylus shaft corresponding the position of the cutting blade shown in FIG. 15.

The notch is cut into the key blank 12 by rotating the lever arm 108 connected to the crank shaft 102. As illustrated in FIGS. 15–20, clockwise rotation of the crank shaft 102 moves the rocker carriage 52 from left to right. As the rocker carriage 52 moves to the right, the stylus shaft 56 contacts the notch template 16. The stylus shaft 56 travels down a first incline side 308 of the template 16 which causes the rocker carriage 52 to rock towards the key blank 12. FIGS. 15 and 16 illustrate the corresponding position of the cutting blade 14 in rela-
tion to the stylus shaft 56 position during the notch cutting procedure. The cutting blade 14 rocks into the key blank leading edge 22 and cuts an incline edge into the key blank 12 corresponding to the incline side 308 of the template 16.

Figure 18:
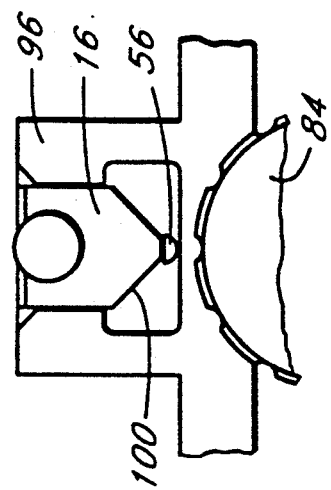
FIG. 18 illustrates the stylus shaft of FIG. 16 showing the stylus shaft in a position corresponding to the position of the cutting blade shown in FIG. 17.
Figure 17:
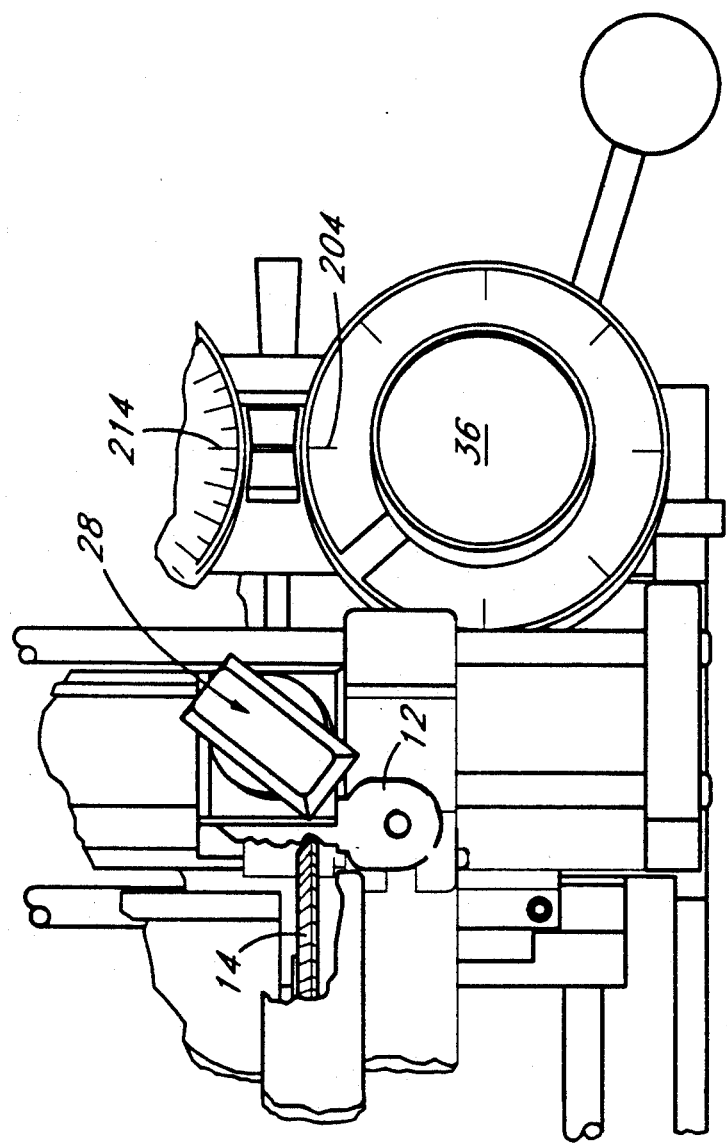
FIG. 17 illustrates the cutting blade of FIG. 15, showing the cutting blade in a position cutting a notch.
Figure 20:
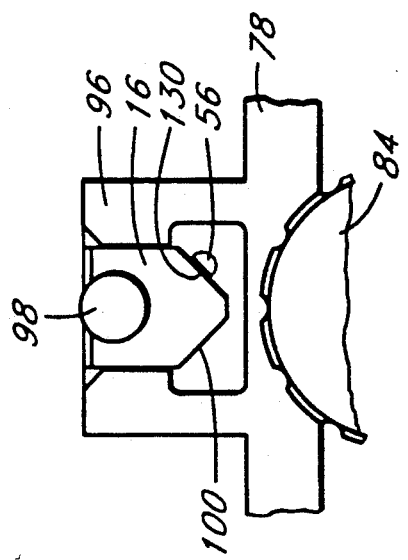
FIG. 20 illustrates the stylus shaft of FIG. 16, showing the stylus shaft in a position corresponding to the position of the cutting blade shown in FIG. 19.
Figure 19:
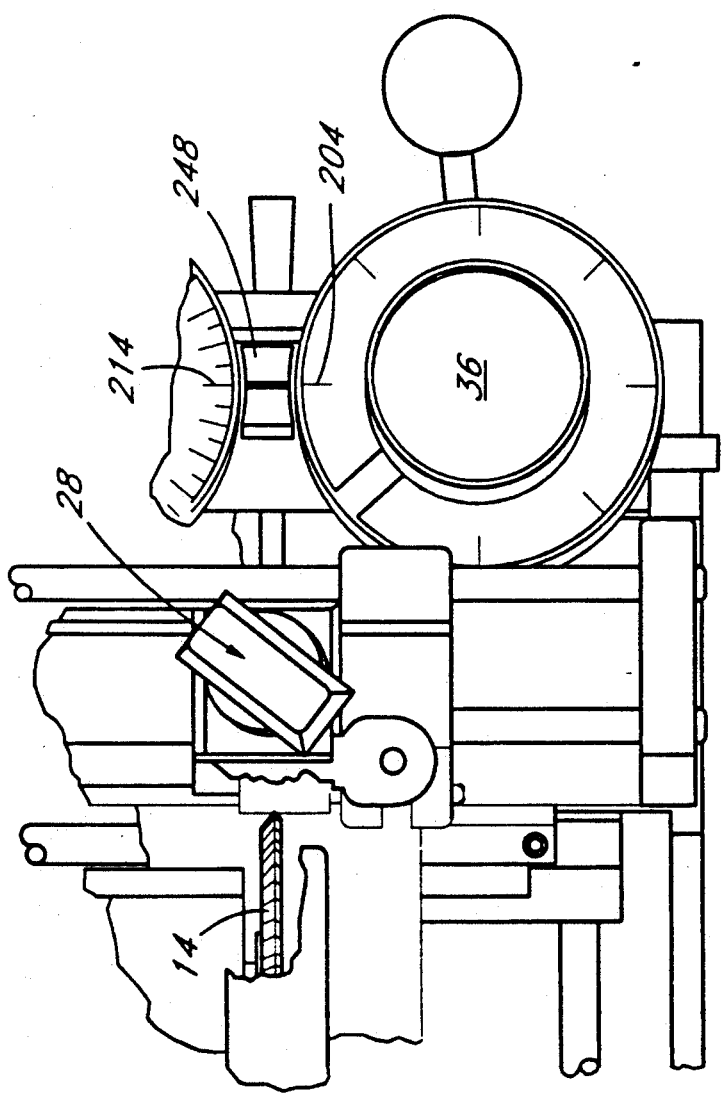
FIG. 19 illustrates the cutting blade of FIG. 15, showing the cutting blade in a position subsequent to cutting the notch.

Continued travel of the stylus shaft 56 along the profile of the notch template 16 produces longitudinal and transverse movement of the cutting blade 14 relative to the key blank working edge 22. As the stylus shaft 56 traces the notch profile, the corresponding movement of the cutting blade 14 transfers the shape to the key blank 12. FIGS. 17 and 18 illustrate the position of the cutting blade 14 in relation to the stylus shaft 56 position as the stylus continues to trace the notch profile. FIGS. 19 and 20 illustrate the cutting blade 14 and stylus shaft 56 positions, respectively, after completion of the notch cutting procedure.

The extent of travel Φ of the cutting blade 14 transverse to the key blank 12 when cutting the notch using the notch tracing mechanism 15 is constant for every notch profile template 16. Similarly, the extent of linear travel of the rocker carriage 52 during the notch cutting process is constant for every notch profile template 16. Thus, the position of the cutting blade 14 can be indexed at a point distanced from the key blank 12, both longitudinally and transversely, to cut the desired notch without contacting the key blank 12 until the notch tracing procedure.

Having cut the first notch, the locksmith returns the motor carriage 46 to the initial position and moves the key carriage 38 to the left to a second notch position distanced from the first notch position by a dimensional increment specified by the manufacturer. The second index mark 206 on the space indexing dial 36 aligns with the datum 248 when the key carriage 38 is positioned to produce a notch in the second notch position. The locksmith subsequently repeats the steps described above to cut the second notch into the key blank 12.

The locksmith can cut additional notches according to the manufacturer's code by repeating the steps outline in the preceding paragraphs.

When cutting security keys, the locksmith tilts the cutting blade 14 by using the tilt mechanism 282. The release shaft 292 is positioned to receive the first ball bearing 296 and the motor assembly 50 is tilted obliquely relative to the key blank working edge 22. The locksmith then lock the motor assembly 50 in the oblique position by rotating the release shaft 292 by about 180°. The locksmith subsequently cuts the key blank 12 in accordance with the preceding disclosure.

Although this invention has been described in terms of certain preferred embodiments, other embodiments that are apparent to those of ordinary skill in the art are also within the scope of this invention. Accordingly, the scope of the invention is intended to be defined only by the claims which follow.

What is claimed is:

1. An apparatus for cutting notches along and into a key blank working edge in accordance with predetermined specifications, comprising:
   a cutting blade having a sharp leading edge for cutting a key blank, said cutting blade defining a plane;
   a clamp for selectively securing a key blank having a working edge in a position with said working edge facing said cutting edge of said cutting blade;
   a key carriage for moving said clamp transverse to said plane defined by said cutting blade;

a first gauge for monitoring movement of said clamp in a direction perpendicular to said plane defined by said cutting blade; and a first linkage coupling said key carriage to said first monitoring gauge such that said first gauge is freely movable relative said key carriage thereby permitting the selective initialization of said first gauge, yet converting movement of said key carriage into movement of said first gauge.

2. The apparatus of claim 1, wherein said first linkage comprises a first linkage portion located to the first gauge side of said linkage and a second linkage portion located to the key carriage side of said linkage, said linkage additionally comprising a frictional connection interconnecting said first linkage portion and said second linkage portion, said frictional connection not being able to communicate an amount of force greater than the frictional force opposing movement of said second linkage portion, yet being able to communicate an amount of force greater than the frictional force opposing movement of said first linkage portion.

3. The apparatus of claim 2, wherein said first gauge comprises a first rotatable dial.

4. The apparatus of claim 1, wherein said first gauge further comprises a first removable template including a plurality of indexing marks spaced apart by a dimensional increment proportionally corresponding to a predetermined dimensional increment between notch positions on a key blank.

5. The apparatus of claim 1, further comprising:

a motor carriage for moving said cutting blade transverse to a longitudinal axis of a key blank secured within said clamp;

a second gauge for monitoring movement of said motor carriage in a direction transverse to said longitudinal axis of a key blank secured within said clamp; and a second linkage coupling said motor carriage to said second monitoring gauge such that said second gauge is freely movable relative to said motor carriage, thereby permitting the selective initialization of said second gauge, yet converting movement of said motor carriage into movement of said second gauge.

6. The apparatus of claim 5, wherein said second linkage comprises a first linkage portion located to the second gauge side of said linkage and a second linkage portion lcoated to the motor carriage side of said linkage, said second linkage additionally comprising a frictional connection interconnecting said first linkage portion and said second linkage portion, said frictional connection not being able to communicate a level of force greater than the frictional force opposing movement of said second linkage portion, yet being able to communicate a level of force greater than the frictional force opposing movement of said first linkage portion.

7. The apparatus of claim 6, wherein said second gauge comprises a second rotatable dial.

8. The apparatus of claim 7, wherein said second gauge further comprises a removable template including a plurality of indexing marks spaced apart by a dimensional increment proportionally corresponding to a predetermined desired dimensional increment between notch depths.

9. The apparatus of claim 8, wherein said first linkage comprises a carriage shaft affixed to said carriage, a transfer shaft coupled to said carriage shaft, a dial spindle affixed to said dial and a biasing mechanism to force together said transfer shaft and said dial spindle in frictional contact.

10. An apparatus for cutting notches along and into a key blank working edge in accordance with predetermined specifications, said apparatus comprising:

a cutting blade having a sharp leading edge to cut a key blank, said cutting blade defining a plane;

a clamp for selectively securing a key blank having a working edge in a position with said working edge facing said cutting edge of said cutting blade;

a motor carriage for moving said cutting blade transverse to a longitudinal axis of a key blank secured within said clamp;

a gauge for monitoring movement of said motor carriage in a direction transverse to a longitudinal axis of a key blank secured within said clamp;

a linkage coupling said motor carriage to said monitoring gauge such that said gauge is freely movable relative said motor carriage, thereby permitting the selective initialization of said gauge, yet converting movement of said motor carriage into movement of said gauge.

11. The apparatus of claim 10, wherein said linkage comprises a first linkage portion located to the monitoring gauge side of said linkage and a second linkage portion located to the motor carriage side of said linkage, said linkage additionally comprising a frictional connection interconnecting said first linkage portion and said second linkage portion, said frictional connection not being able to communicate a level of force greater than the frictional force opposing movement of said second linkage portion, yet being able to communicate a level of force greater than the frictional force opposing movement of said first linkage portion.

12. The apparatus of claim 11, wherein said linkage comprises a carriage shaft affixed to said respective carriage, a transfer shaft coupled to said carriage shaft, a dial spindle affixed to said dial and a biasing mechanism to force together said transfer shaft and said dial spindle in frictional contact.

13. The apparatus of claim 10, additionally comprising a tilt mechanism to position said cutting blade obliquely relative to said key blank working edge.

14. An apparatus for cutting notches along and into a key blank, comprising:

a cutting blade to cut said key blank;

a clamp to secure said key blank in a position exposing a working edge of said key blank to said cutting blade;

a notch template having a profile defined by a profile surface, said profile proportionately corresponding to a desired notch profile to be cut into said key blank working edge;

a rocker carriage adapted to move generally parallel to the profile of said notch template, said rocker carriage coupled with said cutting blade to move said cutting blade both parallel and transverse to said key blank working edge secured in said clamp;

a stylus shaft coupled to said rocker carriage and positioned to contact said notch template profile and trace the shape of said notch template profile as said rocker carriage moves along said notch template; and wherein said rocker carriage comprises a forward arm obliquely connected to an incline arm and positioned between said incline arm and said notch profile, said incline arm coupled with said cutting blade and said forward arm coupled with said stylus shaft.

15. An apparatus for cutting notches along and into a key blank, comprising:
- a cutting blade to cut said key blank;
- a clamp to secure said key blank in a position exposing a working edge of said key blank to said cutting blade;
- a notch template having a profile defined by a profile surface, said profile proportionately corresponding to a desired notch prifole to be cut into said key blank working edge;
- a rocker carriage adapted to move generally parallel to the profile of said notch template, said rocker carriage coupled with said cutting blade to move said cutting blade both parallel and transverse to said key blank working edge secured in said clamp;
- a fulcrum shaft to support said rocker carriage, said rocker carriage adapted to move parallel to said notch template by sliding along said fulcrum shaft and adapted to rotate about said shaft to rock said cutting blade into contact with said key blank; and
- a stylus shaft coupled to said rocker carriage and positioned to contact said notch template profile and trace the shape of said notch template profile as said rocker carriage moves along said notch template.

16. The apparatus of claim 15, additionally comprising a crank shaft connected to said rocker carriage by a linkage to transfer rotation of said crank shaft to linearly move said rocker carriage along said notch template profile.

17. The apparatus of claim 16, wherein said stylus shaft has a flat surface to contact said profile surface of said notch template, and said stylus shaft is rotatably coupled to said rocker carriage.

18. The apparatus of claim 15, wherein said cutting blade has a kerf less than a desired notch width.

19. The apparatus of claim 15, wherein a cutting surface defined between a leading edge and an apex of said cutting blade has a steeper incline angle than an incline angle of said notch template profile.

20. The apparatus of claim 15, additionally comprising a tilt mechanism to position said cutting blade obliquely relative to said key blank working edge.

21. An apparatus for cutting notches along and into a key blank working edge in accordance with predetermined specifications, comprising:
- a cutting blade having a sharp leading edge to cut said key blank, said leading edge being positioned generally perpendicular to said key blank working edge;
- a clamp to secure said key blank in a position exposing said key blank working edge to said cutting blade;
- a notch indexing system comprising:
  - a location indexing mechanism comprising a key carriage adapted to move parallel to said cutting blade and coupled to a space dial by a linkage to transfer generally linear movement of said carriage to rotate said space dial; and
  - a depth indexing mechanism comprising a motor carriage adapted to move transversely relative to said key carriage, said motor carriage coupled to a depth dial by a linkage to transfer generally linear movement of said motor carriage to rotate said depth dial, said cutting blade being attached to said motor carriage to move transversely relative to said key carriage;
- a notch template having a profile defined by a profile surface, said profile proportionately corresponding to a desired notch profile to be cut into said key blank working edge;
- a fulcrum shaft supported by said motor carriage;
- a rocker carriage supported by said fulcrum shaft and adapted to move generally parallel to the profile of said notch template by sliding along said fulcrum shaft, said rocker carriage coupled with said cutting blade to move said cutting blade both parallel and transverse to said key blank working edge secured in said clamp; and
- a stylus shaft coupled to said rocker carriage positioned to contact said notch template profile and to trace the shape of said notch template profile as said rocker carriage moves along said template profile to trace the shape of said notch template.

22. The apparatus of claim 21, further comprising a crank shaft connected to said rocker carriage by a linkage to transfer rotation of said crank shaft to move said rocker carriage along said notch template profile.

23. The apparatus of claim 21, additionally comprising a tilt mechanism to position said cutting blade obliquely relative to said key blank working edge.

24. A method of cutting notches along and into a key blank working edge in accordance with predetermined specifications regarding the location of each notch along said working edge relative to a shoulder of the key blank and the depth of each notch into the key blank relative to a non-working edge of the key blank, comprising the steps of:
- positioning a carriage supporting said key blank in an initial position relative to a cutting blade;
- setting an index dial at an initial position by aligning an initial index mark on said dial with a datum mark without moving said carriage from said initial position;
- moving said carriage from said initial position to a first position while moving said dial an amount proportional to the movement of said carriage and determining said first position by stopping movement of said carriage when a first index mark on said dial is aligned with said datum; and
- moving said cutting blade into contact with said key blank and cutting a notch at said first position.

25. The method of claim 24, additionally comprising the steps of:
- setting a depth indexing dial at an initial position by aligning an initial index mark on said depth indexing dial with a datum mark without moving said motor carriage from said initial position; and
- moving said motor carriage from said initial position to a first position while moving said depth dial an amount proportional to the extent of movement of said motor carriage and determining said first position of said depth dial by stopping movement of said carriage when a first index mark on said depth dial is aligned with said datum.

26. The apparatus of claim 14, wherein said rocker carriage is weighted to bias said stylus shaft against said notch template.

27. The apparatus of claim 15 additionally comprising a lever arm coupled to said rocker carriage such that rotation of said lever arm slides said rocker carriage along said fulcrum shaft which causes said stylus shaft to trace said notch template and thereby rotate said rocker carriage about said fulcrum shaft to rock said cutting blade into contact with said key blank.

* * * * *